United States Patent
Phaneuf et al.

(10) Patent No.: US 11,020,658 B2
(45) Date of Patent: Jun. 1, 2021

(54) SYSTEM FOR TESTING COMMAND EXECUTION LATENCY WITHIN A VIDEO GAME

(71) Applicant: Electronic Arts Inc., Redwood City, CA (US)

(72) Inventors: Gerald Richard Phaneuf, Lago Vista, TX (US); James Nunn Hejl, Jr., Austin, TX (US)

(73) Assignee: Electronic Arts Inc., Redwood City, CA (US)

( * ) Notice: Subject to any disclaimer, the term of this patent is extended or adjusted under 35 U.S.C. 154(b) by 142 days.

(21) Appl. No.: 16/359,802

(22) Filed: Mar. 20, 2019

(65) Prior Publication Data

US 2020/0298108 A1     Sep. 24, 2020

(51) Int. Cl.
*A63F 13/31* (2014.01)
*A63F 13/35* (2014.01)
*A63F 13/77* (2014.01)

(52) U.S. Cl.
CPC .............. *A63F 13/31* (2014.09); *A63F 13/35* (2014.09); *A63F 13/77* (2014.09)

(58) Field of Classification Search
CPC ........... A63F 13/31; A63F 13/35; A63F 13/77
See application file for complete search history.

(56) References Cited

U.S. PATENT DOCUMENTS 4,313,200 A  * 1/1982 Nishiura ............ G01R 31/31921
                                                 714/736
8,069,258 B1   11/2011 Howell
8,678,929 B1    3/2014 Nishimura et al.
9,396,702 B2    7/2016 Colenbrander
9,497,358 B2   11/2016 Colenbrander
9,912,562 B2    3/2018 Callahan
2002/0082065 A1 6/2002 Fogel et al.
(Continued)

FOREIGN PATENT DOCUMENTS

JP        2012-139448 A     7/2012

OTHER PUBLICATIONS

Zhou et al., "MPEG Video Decoding with the UltraSPARC Visual Instruction Set", IEEE, pp. 470-475, 1995.
(Continued)

*Primary Examiner* — Kevin Y Kim
(74) *Attorney, Agent, or Firm* — Knobbe Martens Olson & Bear, LLP

(57) ABSTRACT

A video game test system can determine an objective measure of elapsed time between interaction with a video game controller and the occurrence of a particular event within the video game. This objective measure enables a tester to determine whether a video game is objectively operating slowly or just feels slow to the tester, and may indicate the existence of coding errors that may affect execution speed, but not cause visible errors. The system may obtain the objective measure of elapsed time by simulating a user's interaction with the video game. Further, the system may identify data embedded into a frame of an animation by the video game source code to identify the occurrence of a corresponding event. The system can then measure the elapsed time between the simulated user interaction and the occurrence or triggering of the corresponding event.

20 Claims, 7 Drawing Sheets

(56) References Cited

U.S. PATENT DOCUMENTS

| | | |
|---|---|---|
| 2002/0082077 A1 | 6/2002 | Johnson et al. |
| 2005/0170891 A1 | 8/2005 | Shim et al. |
| 2009/0012920 A1 | 1/2009 | Kwok |
| 2010/0124983 A1 | 5/2010 | Gowin et al. |
| 2010/0151926 A1 | 6/2010 | Ruppert et al. |
| 2010/0166058 A1 | 7/2010 | Perlman et al. |
| 2010/0166062 A1 | 7/2010 | Perlman et al. |
| 2010/0166063 A1 | 7/2010 | Perlman et al. |
| 2010/0166064 A1 | 7/2010 | Perlman et al. |
| 2010/0166065 A1 | 7/2010 | Perlman et al. |
| 2010/0166066 A1 | 7/2010 | Perlman et al. |
| 2010/0166068 A1 | 7/2010 | Perlman et al. |
| 2010/0167809 A1 | 7/2010 | Perlman et al. |
| 2010/0167816 A1 | 7/2010 | Perlman et al. |
| 2011/0107220 A1 | 5/2011 | Perlman |
| 2011/0122063 A1 | 5/2011 | Perlman et al. |
| 2011/0302454 A1 | 12/2011 | Prophete et al. |
| 2012/0069131 A1 | 3/2012 | Abelow |
| 2012/0071236 A1 | 3/2012 | Ocko et al. |
| 2012/0101799 A1 | 4/2012 | Fernandes |
| 2012/0172118 A1 | 7/2012 | Shimamura et al. |
| 2014/0213368 A1 | 7/2014 | Jacob et al. |
| 2014/0359558 A1 | 12/2014 | Chamberlain |
| 2015/0067819 A1 | 3/2015 | Shribman et al. |
| 2015/0181084 A1 | 6/2015 | Colenbrander |
| 2015/0281029 A1 | 10/2015 | Callahan |
| 2016/0179730 A1 | 6/2016 | Halleck et al. |
| 2016/0180811 A1* | 6/2016 | Colenbrander ........... G06T 7/90 345/207 |
| 2016/0256784 A1 | 9/2016 | Schultz et al. |
| 2016/0309140 A1 | 10/2016 | Wang et al. |
| 2016/0332081 A1 | 11/2016 | Marr et al. |
| 2017/0160796 A1* | 6/2017 | Oto ........................ A63F 13/35 |
| 2017/0312626 A1 | 11/2017 | Colenbrander |
| 2018/0001205 A1 | 1/2018 | Osman et al. |
| 2018/0091392 A1 | 3/2018 | Richards et al. |
| 2018/0091394 A1 | 3/2018 | Richards et al. |
| 2018/0091401 A1 | 3/2018 | Richards et al. |
| 2018/0091413 A1 | 3/2018 | Richards et al. |
| 2018/0276111 A1 | 9/2018 | Datta |
| 2018/0349108 A1 | 12/2018 | Brebner |
| 2019/0004793 A1 | 1/2019 | Brebner |
| 2019/0129418 A1 | 5/2019 | Swan et al. |
| 2019/0134506 A1 | 5/2019 | Gupta et al. |
| 2019/0349449 A1 | 11/2019 | Shribman et al. |
| 2020/0298108 A1 | 9/2020 | Phaneuf et al. |
| 2020/0301814 A1 | 9/2020 | Phaneuf et al. |

OTHER PUBLICATIONS

Huang et al., "Using Offline Bitstream Analysis for Power-Aware video Decoding in Portable Devices", pp. 299-302, 2005.

* cited by examiner

SYSTEM FOR TESTING COMMAND EXECUTION LATENCY WITHIN A VIDEO GAME

RELATED APPLICATIONS

This application hereby incorporates by reference herein in its entirety for all purposes U.S. application Ser. No. 16/359,836, filed on Mar. 20, 2019 and titled "SYSTEM FOR TESTING COMMAND EXECUTION LATENCY WITHIN AN APPLICATION."

BACKGROUND

Many video games are complex software applications that utilize a significant percentage of a computer system's resources. Each year the complexity of many of the latest video games pushes the boundaries of the latest computing systems. Modern video games comprise millions of lines of code. Testing the code of such large applications can be a time consuming and challenging process. Further, because video games are often programmed by teams of developers, changes made by one developer or team of developers working on one portion of the video game may impact code developed by another developer or team of developers working on another portion of the video game. Ensuring that a video game operates as desired can be particularly challenging when the video game is composed of different modules, which may be created independently, that are configured to operate together to create a single video game or application. Thus, code must often be tested and retested repeatedly as changes are made to the code by different teams.

SUMMARY OF EMBODIMENTS

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

Certain aspects of the present disclosure relate to a video game test system configured to test an event latency during execution of a video game. The video game test system may comprise a front-end system and a back-end system. The front-end system may be configured to: access a first command that emulates an interaction by a user with a user interface device of a user computing system; and provide the first command to the user computing system to interact with a video game hosted by the user computing system, wherein providing the first command to the user computing system triggers a timer. The back-end system may be configured to: receive one or more output signals from the user computing system; convert the one or more output signals to a set of pixels, the set of pixels corresponding to a frame output for display by the user computing system; identify a presence of a stop condition embedded in the set of pixels; and determine an event latency of an event based at least in part on a first time when the timer is triggered and a second time associated with identification of the presence of the stop condition, wherein the event is triggered at least in part by execution of the first command.

The system of the preceding paragraph can include any combination or sub-combination of the following features: where the front-end system comprises a non-volatile storage configured to store one or more command sequences corresponding to one or more interaction sequences with the user interface device, at least one of the one or more command sequences including the first command; where the front-end system comprises a storage configured to store the first command and a user interface circuit configured to provide the first command to the user computing system, and wherein the storage is collocated with the user interface circuit reducing input latency associated with simulating user input to the user computing system; where the front-end system is further configured to trigger the timer substantially in parallel with providing the first command to the user computing system; where the front-end system is further configured to trigger a second timer when providing a second command to the user computing system; where the front-end system comprises a user interface circuit configured to emulate the interaction by the user with the user interface by providing the first command to the user computing system via an interface port of the user computing system; where the back-end system comprises the timer; where the back-end system is further configured to identify the stop condition by: filtering a subset of pixels from the set of pixels, the subset of pixels configured to store embedded data; decoding the subset of pixels to obtain the embedded data; and determining whether the embedded data includes the stop condition; where the back-end system comprises a controller configured to provide a subset of pixels from the set of pixels to the timer; where the back-end system is further configured to determine the event latency of the event based at least in part on the first time, the second time, and a communication delay between the controller and the timer; where the front-end system comprises one or more integrated circuits and the back-end system comprises one or more integrated circuit that are separate from the front-end system; where the event comprises at least one of: output of an animation, output of a frame within the animation, output of a sound, a change in state of the video game, or a change in state of an element of the video game; and where the front-end system is configured to modify a test of the video game based at least in part on the event latency of the event.

Additional aspects of the present disclosure relate to a method of testing an event latency during execution of a video game. The method may be implemented by a video game test system that is itself implemented in hardware. The hardware may include one or more application-specific hardware circuits or systems. In certain embodiments, the hardware may be general purpose hardware with application-specific instructions, or a combination of general purpose and application-specific hardware. The method may include receiving a trigger to test an event latency of an event within a video game, wherein the event latency comprises an amount of time between interaction with a user interface device of a user computing system hosting the video game and an occurrence of the event; responsive to receiving the trigger, accessing a first command from a command sequence storage, the first command emulating the interaction by a user with the user interface device; providing the first command to the user computing system via an interface of the user computing system configured to communicate with the user interface device, wherein the video game test system interfaces with the user computing system as a substitute for the user interface device; receiving a set of output signals from an output port of the user computing system; converting the set of output signals to a set of pixels; identifying a stop flag embedded in the set of pixels; and responsive to identifying the stop flag, determining the event latency of the event based at least in part on a first time associated with providing the first command and a second time associated with identifying the stop flag.

The method of the preceding paragraph can include any combination or sub-combination of the following features: where determining the event latency further comprises modifying a determined latency by a communication overhead time associated with communication between elements of the video game test system; where determining the event latency further comprises modifying a determined latency by a vertical synchronization latency associated with the user computing system; where the method further comprises filtering the set of pixels to obtain a subset of pixels comprising embedded data, wherein identifying the stop flag embedded in the set of pixels comprises extracting data embedded in the subset of pixels and determining whether the extracted data includes the stop flag; where the method further comprises outputting the event latency for presentation to a user on a user interface; and where the method further comprises selecting a second command to provide to the user computing system based at least in part on the event latency.

Yet additional aspects of the present disclosure relate to a video game test system configured to test command execution latency during execution of a video game. The video game test system may comprise storage configured to store one or more commands that emulate interaction by a user with a user interface device of a user computing system and processing circuitry. The processing circuitry may be application-specific processing circuitry, such as an application-specific integrated circuit and/or general purpose processing circuitry configured to execute application-specific computer executable instructions. The processing circuitry may be configured to: access a command from the storage; provide the command to the user computing system to interact with a video game hosted by the user computing system; initiate a timer at a first time when providing the command to the user computing system; obtain a set of output signals from the user computing system, the output signals associated with a frame output for display on a display; convert the output signals to a set of pixels; process the set of pixels to obtain embedded data included in a subset of the set of pixels; stop the timer at a second time when it is determined that the embedded data includes a stop condition; and determine a command execution latency associated with the command based at least in part on the first time and the second time.

Certain aspects of the present disclosure relate to an application test system configured to test code efficiency of an application. The application test system may include a hardware processor. This hardware processor may be a general purpose hardware processor configured to execute application-specific computer executable instructions. Further, the hardware processor may comprise one processor or a set of hardware processors, which may be distributed. Alternatively, the hardware processor may be or include application-specific circuitry. In yet other embodiments, the hardware processor may include a combination of application-specific circuitry and general purpose hardware. The hardware processor may be configured to: provide a user command to a computing system hosting an application, the user command simulating user interaction with the application at the computing system; initiate a timer substantially in parallel with providing the user command to the computing system; capture output from the computing system that is output via a display port of the computing system; determine whether the output includes embedded data associated with a stop event; and upon determining that the output includes the embedded data associated with the stop event, determine a command latency value based on the timer. In certain embodiments, there is less than a threshold time difference between when the timer is initiated and the user command is provided to the computing system. For example, the threshold time difference may be 5 ms, 100 ns, 500 ns, any value in between the foregoing, and the like.

The system of the preceding paragraph can include any combination or sub-combination of the following features: where the timer measures a passage of time; where the timer measures a number of events occurring between initiation of the timer and detection of the stop event; where the events comprise frames output on a display; where capturing the output from the computing system does not prevent the output from being provided to a display via the display port; where the stop event comprises an event performed by the application in response to the user command; where the application comprises a video game; where the hardware processor is further configured to determine whether the output includes embedded data associated with the stop event by: converting the output to a set of pixels of an animation frame; decoding at least a portion of the set of pixels to obtain a decoded subset of pixels; and determining whether the decoded subset of pixels includes the embedded data associated with the stop event; where the command latency value comprises a measure of time between an event trigger and an occurrence of a corresponding event, wherein the event trigger comprises providing the user command to the computing system; and where the hardware processor is further configured to select a second user command to provide to the computing system based at least in part on the command latency value.

Additional aspects of the present disclosure relate to a method of testing code efficiency of an application. The method may be implemented by an application test system configured with specific computer-executable instructions. The application test system may include application-specific hardware and/or general purpose hardware configured to implement the specific computer-executable instructions. The method may include: providing a user command to a computing system hosting an application, the user command simulating user interaction with the application at the computing system; initiating a counter substantially in parallel with providing the user command to the computing system; capturing output from the computing system that is output via an output port of the computing system; determining whether the output includes data associated with a target event; and upon determining that the output includes the data associated with the target event, determining a command latency based on a value of the counter.

The method of the preceding paragraph can include any combination or sub-combination of the following features: where the counter counts an amount of time that has elapsed between initiation of the counter and determination that the output includes the data associated with the target event; where the counter counts a number of events that have occurred or frames that have been output between initiation of the counter and determination that the output includes the data associated with the target event; where the target event comprises an event performed by the application in response to the user command and a state of the application; where determining whether the output includes data associated with a target event comprises: converting the output to a set of pixels of an image; decoding at least a portion of the set of pixels to obtain a decoded subset of pixels; and determining whether the decoded subset of pixels includes the data associated with the target event; where the data associated with the target event is inserted into the image as a substitute for pixel data of the image by test code inserted into the application; and where the method further comprises selecting a second user command to provide to the computing system based at least in part on the command latency.

Yet additional aspects of the present disclosure relate to a non-transitory computer-readable storage medium storing computer executable instructions that, when executed by one or more computing devices, configure the one or more computing devices to perform one or more operations. The one or more operations may comprise: providing a user command to a computing system hosting an application, the user command simulating user interaction with the application at the computing system; initiating a counter substantially in parallel with providing the user command to the computing system; capturing output from the computing system that is output via an output port of the computing system; determining that the output includes data associated with a target event; and responsive to determining that the output includes the data associated with the target event, determining a command latency based on a value of the counter.

The computer-readable, non-transitory storage medium of the preceding paragraph can include any combination or sub-combination of the following features: where determining that the output includes data associated with a target event comprises: converting the output to a set of pixels of an image; decoding at least a portion of the set of pixels to obtain a decoded set of pixels; and determining that the decoded set of pixels includes the data associated with the target event; and where the operation further comprise selecting an automated test to perform with respect to the application based at least in part on the command latency.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Introduction

Figure 1:
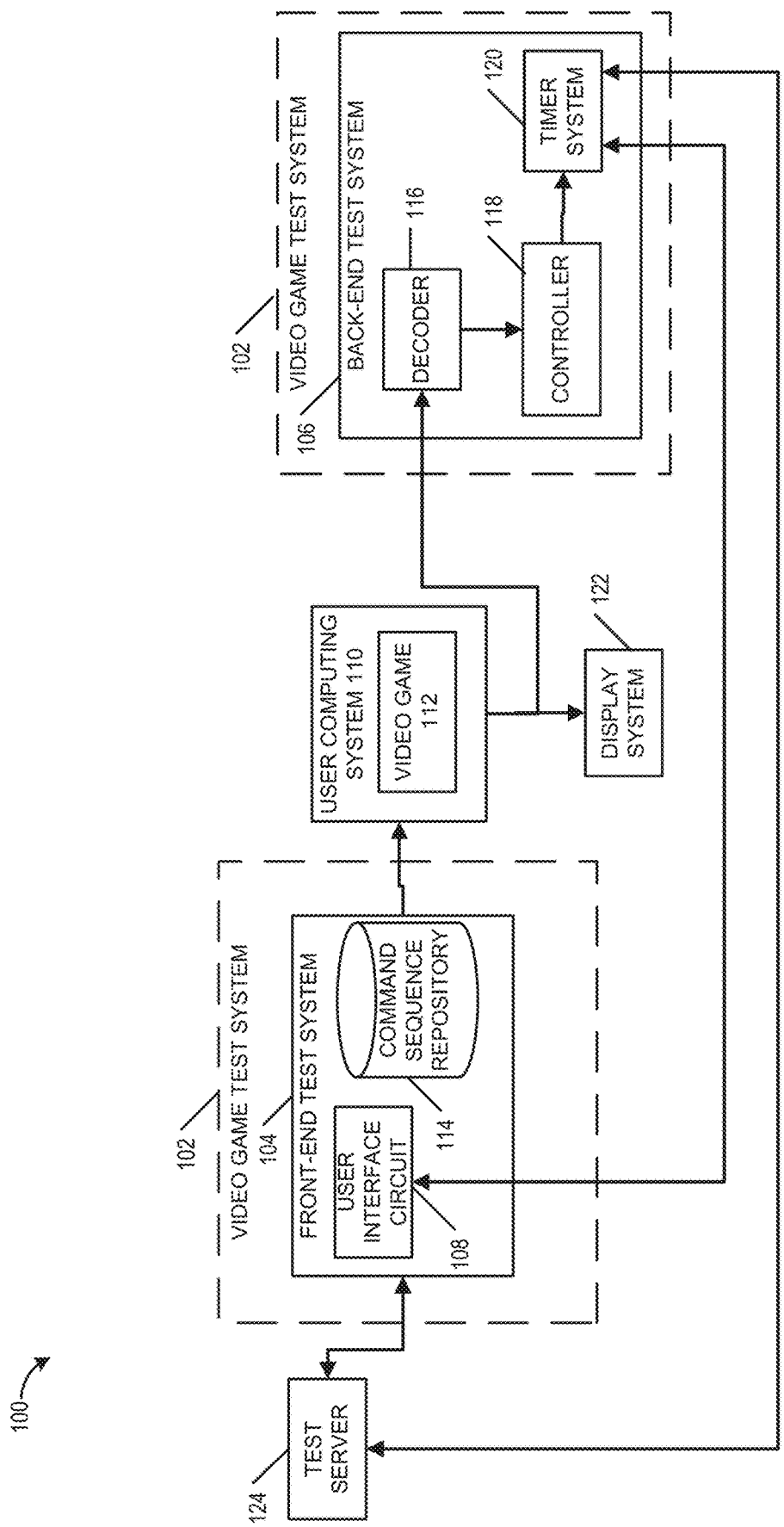
FIG. 1 illustrates a video game test environment in accordance with certain embodiments.

One aspect of video games that can be important to test is responsiveness of the video game. Responsiveness of the video game may relate to an amount of time between when a user interacts with a video game and a corresponding action is performed by the video game. This time difference may be referred to as a "latency" or "command latency" of the video game. For example, it can be important to determine an amount of time between the user pressing a button of a user interface device (for example, a controller of a video game console or a keyboard of a laptop) and the occurrence of a corresponding event or action, such as the firing of a bullet, the accelerating of a vehicle, or a shooting of a basketball.

There are a number of reasons that an interaction with the video game and the occurrence of an event may have a particular latency. Some of the causes of latency may be due to coding errors or design errors. For example, the code may include incorrect function calls, errors in configuring certain state variables, poor or less than optimal object design, the selection of less efficient data structures than substitute options, the selection of less efficient methods, functions, libraries than substitute options, the use of less efficient code than other possible code options, or use of deprecated functionality within a game engine or a programming language. Other causes of latency may be due to decisions that may not necessarily be errors, but can modify the latency between interaction with the video game and the occurrence of an event. For example, an animator may extend the length of an animation associated with an event, such as shooting a basketball. This extended animation may make the shot appear more smooth, but may delay the response to interactions by the user with user interface device. In the basketball shooting example, there is not necessarily an error that relates to extended latency, but instead the latency may relate to the design choice between a smoother animation and a faster response time.

Moreover, for different video games, there may be a different acceptable level of latency between issuance of a command, such as through interaction with the user interface device, and the triggering of an action or event. In some cases, it may even be desirable to have a greater amount of latency. For example, latency may be introduced to mimic environmental effects, such as an increase in gravity, to reflect an injury to a user playable character, or to instill a certain atmosphere or sense of dread (for example, latency may be purposefully introduced at points where a monster, such as a zombie, is chasing the user playable character). As another example, in a racing game latency may be introduced between different vehicles to reflect different levels of acceleration. In certain embodiments, some actions or input sequences may occur more quickly than other actions or input sequences, which can create a feeling of inconsistency in a responsiveness of the video game. Thus, to address this inconsistency in responsiveness of input sequences, in certain embodiments, latency may be added to create delay consistency across a plurality of input sequences.

Regardless of whether the latency is intentional or not, it is important for users, such as designers or testers, to be able to determine a latency between an interaction with a video game and an event triggered by the interaction with the video game. Often a tester will play a different iterations of a video game to determine a latency between interacting with the video game and a corresponding event associated with the interaction with the video game. However, this is often not sufficient. In some cases, a user's evaluation of the responsiveness of a video game, or the latency between a user interaction with the video game and the occurrence of a corresponding event in the video game is subjective. For example, one user may feel the responsiveness of a video game is slow, or feels sluggish, while another user may find the video game to not be sluggish. As another example, a user may find a game to be responsive on one day, but believe it sluggish on another day despite no change in the objective latency between interaction with the video game and a corresponding event. This subjective evaluation of latency adds to the challenge in testing a video game during development. Thus, it is desirable to have an objective measure of latency.

It is often not sufficient to obtain a subjective sense of latency. Instead, it is desirable to have an objective measure of latency. One solution to obtain a measure of latency is to use a high-speed camera to capture frames displayed on a display of user computing system that executes the video game under test in conjunction with a controller status board that uses lights to reflect the status of a video game controller, or other user interface device. A user can count the number of frames occurring between a first frame when the controller status board indicates a particular status of the controller and a second frame corresponding to a particular event. This solution can be cumbersome and difficult, and is less than ideal. One drawback of this solution is that it requires a large setup that can be both expensive and cumbersome to position and operate. In addition, although more objective than a user's perception of latency, the solution is not wholly objective as it relies on a user to identify when a user interaction was captured by the controller and to manually count the number of frames until a particular event is displayed. Further, the event may be limited to events related to animation or that affect the content output for display. In addition, the measurement is not easily repeatable across different tests because, for example, of the reliance on a user to determine when to begin the frame count and to perform the frame count. Moreover, each time the video game is modified during development, a user (for example a tester or designed) must manually perform and repeat the tests. Having a user perform the tests may result in test errors or inconsistencies in measurement. In addition, because the measurement relies on a user viewing the displayed frames, the latency measurement is inexact and does not account for system variabilities and variable refresh rates of different displays.

Discrepancies between system variabilities can be reduced by using identical test machine configurations. However, using identical test machine configurations is not always possible because a video game is often designed for play by different user computing machines and/or different video game consoles. For example, a video game may be configured for play on a Sony® PlayStation® machine, a Microsoft® Xbox® machine, one or more portable devices (such as smartphones), or varying configurations of personal computer setups.

Embodiments disclosed herein present systems and processes for obtaining an objective measurement of latency between an input to a user computing system that hosts or executes a video game and the occurrence of an event that corresponds to or is otherwise triggered by the input. The system can include a front-end system that communicates directly with the user computing system via, for example, an input port of the user computing system that is configured to receive input form a user interface device. Thus, in certain embodiments, the front-end system may substitute for a controller that plugs into a video game console or for a keyboard the plugs into a computer. This front-end system may provide one or more commands to the user computing system that may function as a substitute for, or may emulate, a user interacting with the user interface device to interact with a video game being executed by the user computing system. At substantially the same time (for example, at the same time or within less than a threshold amount of time, such as 50 nanoseconds, 10, nanoseconds, 5 nanoseconds, or less) as a command is provided to the user computing system, the system may trigger a timer that counts an amount of time until an event corresponding to or otherwise triggered by the command occurs.

The system can further include a back-end system that obtains output from the user computing system via, for example, an output port of the user computing system that is configured to provide an output to a display for presentation to a user on the display. In certain embodiments, the output includes a set of signals output by the output port of the user computing system. These signals may be electrical signals communicated through a port connection to an electronic device, such as a monitor. The back-end system can obtain the signals from the output port and decode the signals to obtain pixels for a frame or image. Further, the back-end system can identify data embedded in the pixels to determine the occurrence of the event that corresponds to or is otherwise triggered by the input. Upon identifying the occurrence of the event, the back-end system can determine a time that has elapsed since the input that triggered the event determining an objective measure of latency between the input and the event.

To simplify discussion, the present disclosure is primarily described with respect to a video game. However, the present disclosure is not limited as such may be applied to other types of applications. For example, embodiments disclosed herein may be applied to educational applications or other applications where it may be desirable to measure a latency between interaction with a user input device and an event corresponding to or otherwise triggered by the interaction with the user input device. Further, the present disclosure is not limited with respect to the type of video game. The use of the term "video game" herein includes all types of games, including, but not limited to web-based games, console games, personal computer (PC) games, computer games, games for mobile devices (for example, smartphones, portable consoles, gaming machines, or wearable devices, such as virtual reality glasses, augmented reality glasses, or smart watches), or virtual reality games, as well as other types of games.

Moreover, while primarily described with respect to testing a video game during development, embodiments disclosed herein may be used for other use cases where the measurement of latency may be desirable. For example, in competitive events involving video games, sometimes referred to as "esports," it is important for the responsiveness of systems used by the players to be identical, or as close to identical as possible given current technologies. As such, each computing system and display system of each player will typically be configured the same. However, errors in configuration can sometimes lead to inconsistencies in execution of the video game. Further, differences in the ambient environment may affect operation of the host computing systems. For example, a computing system positioned nearer a window than another computing system positioned under an air conditioning vent may run hotter and consequently, a slower. With the large amounts of money that can sometimes be spent during these competitions (for example as prize money, advertising money, sponsorships, television rights, and the like) it is important for balance among the systems used by competitors. Even a small difference in the speed of operation of a system due, for example, to differences in temperature of the computing systems can have consequences in terms of the perceived legitimacy and fairness of the competition. Thus, it is important for stakeholders (for example, players, spectators, sponsors, and the like) to have confidence in the fairness of the competition. In certain embodiments, the systems disclosed herein can be used to test each computing system hosting an instance of the video game to confirm that each computing system is running identically and that there is not a difference in command execution latency between different competitors user computing systems.

Example Video Game Test Environment

FIG. 1 illustrates a video game test environment 100 in accordance with certain embodiments. The video game test environment 100 can include an environment for testing a video game, such as the video game 112, or a system, such as the user computing system 110, that hosts the video game 112. For example, the video game test environment 100 may be configured to test a video game 112 under development to determine an objective measure of latency between issued or received commands, and the execution of the commands, or the occurrence of an event that may directly or indirectly correspond to or be triggered by the commands. For example, the video game test environment 100 may be used to determine a measure of time or latency between when a user, such as a player, developer, or tester, pushes or otherwise interacts with a button on a user interface device (for example, a video game console controller, a keyboard, or a touchscreen interface) and the video game 112 performs an action corresponding to the interaction with the button. However, the video game test environment 100 may also test a latency for events that are triggered by a combination of button interactions or a combination of one or more button presses and a particular state of the video game 112. In some embodiments, the video game test environment 100 may enable testing of a latency between multiple states of the video game 112. These multiple states of the video game 112 may or may not be triggered by user interaction with the video game. For example, in some cases, the change in state of the video game 112 may relate to a passage of time, execution of code within the video game 112 itself, or the execution of an application other than the video game 112 that may cause a change in state of the video game 112, such as an auction application that enables users to auction items obtained within the video game 112.

Moreover, as stated above, in some cases, the video game test environment 100 may be used to test the user computing system 110 itself. For example, the video game test environment may be used to determine whether execution of the video game 112 on multiple user computing systems 110 result in the same latency. As previously described, ensuring that when the same interactions with a video game 112 occur on multiple user computing systems 110 the latency is equal can be important in competitive environments, such as for esports.

The video game test environment 100 includes a video game test system 102 that is configured to test a video game 112 and/or a user computing system 110 that hosts or executes at least a portion of the video game 112. As illustrated in FIG. 1, the video game test system 102 may be divided into multiple sub-systems. For example the video game test system 102 may be divided into a front-end test system 104 and a back-end test system 106. The front-end test system 104 and the back-end test system 106 may be implemented as separate systems that are housed separately. Alternatively, the front-end test system 104 and the back-end test system 106 may be a single system that is enclosed in a single housing. Regardless of whether the video game test system 102 is implemented as a single system or as separate systems, the two subsystems can, in some cases, be conceptually thought of as one system or as multiple distinct systems.

Moreover, as is described in more detail below, the video game test system 102 may be implemented using multiple different hardware processors. At least some of the hardware processors may be of different types. Further, at least some of the hardware processors may be implemented in different application-specific hardware that is configured to perform particular functions associated with the processes described herein. In other embodiments, the functionality of the video game test system 102 may be implemented by a single hardware processor configured to perform the particular processes described herein. In certain embodiments, the single hardware processor may be a general purpose processor that can execute one or more instructions to perform the processes described herein.

The front-end test system 104 may include a user interface circuit 108 and a command sequence repository 114. The user interface circuit 108 may serve as a substitute for, or may simulate, a user interface device of the user computing system 110. For example, if the user computing system 110 is a console, such as a PlayStation® or an Xbox®, the user interface circuit 108 may simulate a controller for the console. Alternatively, the user interface circuit 108 may simulate a keyboard, a mouse, a touchscreen input device, or any other input device that may be used to interact with a video game hosted by the use computing system 110. The user interface circuit 108 may obtain a command that corresponds to a user interacting with a user interface device, and provide the command to the user computing system 110. This command may be formatted the same or similar to what a user interface device (for example, an Xbox® controller) communicates to a user computing system 110. In some embodiments, the command may be a status of buttons or interface elements of the user interface device instead of or in addition to a command. For example, the user interface circuit 108 may communicate a data structure that includes a status of one or more user interface elements of the user interface device that is being simulated by the user computing system 110.

In certain embodiments, the user interface circuit 108 may obtain a sequence of commands and may provide the sequence of commands to the user computing device 110. The sequence of commands may be provided in series simulating a user's performance of a series of interactions with a user interface device. Alternatively, the sequence of commands may be provided in parallel simulating a user's ability to perform a combination of interactions with a user interface device, such as the pressing of a direction button or an analog stick while simultaneously pressing an action button on a gamepad or controller. In yet other embodiments, at least some of the sequence of commands may be provide in parallel while other commands are provided serially. The commands that the user interface circuit 108 provides to the user computing device 110 may be the same commands that a user interface device would provide to the user computing device 110 if a user were interacting with the user interface device to perform the same interactions.

The commands or command sequence may be provided to the front-end test system 104 by the test server 124. A user, such as a designer or tester of the video game 112 may generate a sequence of commands to test the video game 112 using the test server 124. The test server 124 may then provide the sequence of commands to the front-end test system 104, which may store the commands at the command sequence repository 114. The command sequence repository 114 may store multiple sequences of commands. Each of the sequences of commands may be associated with a separate label or identifier. A particular sequence of commands may be selected by the front-end test system 104 or the user interface circuit 108 based on the selection or identification of a particular desired test.

During execution of a latency test, the user interface circuit 108 may obtain the command or sequence of commands used during the test from the command sequence repository 114. Advantageously, in certain embodiments, by obtaining the commands from the command sequence repository 114 that is included as part of the front-end test system 104, latency that may occur by communicating with the test server 124 may be eliminated. Further, the front-end test system 104 can be pre-loaded with test command sequences, eliminating the need for the test server 124 to be present during performance of the test. Accordingly, the video game test system 102 may have increased portability compared to a system that receives commands from the test server 124 during performance of the testing process.

Moreover, storing command sequences at the command sequence repository 114 enables a particular test to be repeated a number of times on the video game 112, or on multiple iterations or versions of the video game 112. For example, each time a change is made to the video game 112 during development, or when an update or expansion is development for the video game 112, tests can be more easily repeated using stored test sequences stored at the command sequence repository 114. Further, by storing commands at the command sequence repository 114, tests can be performed using an automated process or with reduced or no user involvement compared to systems that may require a user to interact with the video game 112 and to measure latency using by counting frames captured by a high-speed camera.

The back-end test system 106 may capture output from the user computing system 110. This output may be signals that are output from the user computing system to a display system 122. In certain embodiments, the back-end test system 106 may replace the display system 122. In other embodiments, a splitter or other electronics (not shown) may be used to provide a copy of the output signals provided to the display system 122 to the back-end test system 106. By splitting the signal, a user can observe output on the display system 122 while the back-end test system 106 measures the latency between issued commands and corresponding triggered events occurring at the video game 112. It should be understood that, unlike prior attempts that use high-speed cameras to measure latency within a video game 112, it is unnecessary for the output of the video game 112 to be displayed on a display system to measure latency using certain embodiments disclosed herein.

The back-end system 106 may include a decoder 116, a controller 118, and a timer system 120. The decoder 116 of the back-end system 106 may connect to the user computing system 110 via an output port, such as a display port, of the user computing system 110. For example, the decoder 116 may connect to a DisplayPort, a Digital Visual Interface (DVI) port, or a High-Definition Multimedia Interface (HDMI) port. Generally, the decoder 116 connects via a wired connection to an output port of the user computing system 110. By connecting via a wired connection, latency that may be introduced due, for example, to interference in a wireless connection, may be avoided. However, in certain embodiments, the decoder 116 may connect to the user computing system 110 using a wireless connection.

The decoder 116 may include any circuit or system that can obtain signals from the user computing system 110, via an output port of the user computing system 110, and can convert the signals to pixels. For example, the decoder 116 may be configured to convert HDMI signals to a set of pixels representing a frame of an animation generated by the video game 112. This frame may be part of an animation that the developer of the video game 112 intended to be displayed on a display, such as the display provided by the display system 122.

The decoder 116 may provide the pixels to the controller 118. In certain embodiments, the decoder 116 provides the pixels a frame at a time to the controller 118. In other embodiments, the decoder 116 provides the pixels to the controller 118 as the controller 118 converts the output signals to pixels. Thus, in some cases, the controller 118 may receive portions of a frame while the decoder 116 continues to convert received signals to additional pixels included in the frame.

The controller 118 may include any system or circuit that can process pixels received from the decoder 116 to identify a subset of pixels, which may store embedded data. In some cases, the entire set of pixels representing a frame may be used with embodiments disclosed herein. However, typically only a subset of pixels are used because the remaining pixels are designated, for example, to depict an image or frame of an animation generated by the video game 112.

Processing the pixels to identify the subset of pixels may include filtering the received pixels to obtain a subset of pixels. Filtering the pixels may include identifying particular pixels included in the set of pixels generated by the decoder 116. This subset of pixels may be the first 'n' pixels, where 'n' is some number. For example, the subset of pixels may be the first 1024 pixels, the first 2048 pixels, or any other number of pixels less than the total number of pixels that form a frame of an image. The pixels may be received in a particular order. For example, the pixels may be received starting from the top left corner of a frame and proceeding from left to right and from top to bottom, similar to the order that words are written in an English-language book. Thus, in the previous example, the first 1024 pixels may include 1024 pixels beginning from the top left of a frame and extending 1024 pixels towards the right of the first line in an image. Alternatively, in certain embodiments, the subset of pixels may be the first 'n' bits or bytes of data that stores pixel information. Thus, for example, the subset of pixels may be the set of pixels stored in the first 1024 or 2048 bytes of data obtained from the decoder 116, which may correspond to 341 pixels or 682 pixels assuming a 24-bit or 3-byte RGB image. It should be understood that other bit or byte amounts may be used to represent each pixel resulting in a different amount of pixels per 1024 or 2048 bytes, or other number of bytes that stores embedded data.

The identified subset of pixels may include pixels that are configured to embed information used as part of a testing process, such as a process to test or measure latency between the issuance of commands and the occurrence of corresponding events. This embedded information may identify when particular events have occurred in the video game 112. The information may be embedded in the frame based on the value set for the subset of pixels. For example, the subset of pixels may be configured to depict particular colors or images in order to indicate that a particular event has occurred within the video game 112. As another example, the subset of pixels may be configured to have a particular opaqueness to indicate the occurrence of an event in the video game 112. The event may relate to an occurrence of a particular animation or a particular frame in an animation. However, although the embedded information that identifies the occurrence of an event is embedded in an image or animation frame, the event can include non-animation based events that occur during execution of the video game 112. For example, the event can relate to the playing of a particular sound, the setting of a particular state variable, or the occurrence of any other event related to the execution of the video game 112.

The timer system 120 may include any system or circuit that can determine whether the identified subset of pixels includes the embedded data and/or whether the embedded data includes particular information, and based on the determination, can stop a timer initiated by the front-end test system 104. The particular information may include any information that can be inserted by the video game 112 into one or more pixels of a frame or image to be output. For example, the information may include a stop command or tag that indicates that the timer system 120 is to stop a timer. The information may be inserted into one or more pixels of a frame or image by calling, executing, or otherwise instantiating a function or method from an Application Programming Interface (API) or a Software Development Kit (SDK) used to program the video game 112.

The timer system 120 may initiate one or more timers in response to a trigger received from the front-end test system 104. The front-end test system 104 may trigger a timer when providing a command from the command sequence repository 114 to the user computing system 110. When the timer system 120 identifies a particular tag or piece of data embedded in pixels of a frame, the timer system 120 may stop the timer. The timer system 120 may provide a measure of the elapsed time to the test server 124, which may present the measure of the elapsed time to a user. This measure of elapsed time may correspond to a latency between when a command is provided to the user computing system 110 by the user interface circuit and when a corresponding event occurs at the video game 112. In some embodiments, the timer may be a counter that counts the occurrence of a number of events that have occurred within the video game 112 since the counter has been initiated until an event corresponding to the command has occurred. Alternatively, or in addition, the counter may measure a number of frames output by the user computing system 110 until the corresponding event occurs at the video game 112. Thus, in some embodiments, the command latency may be a measure of time, a measure of events occurred, a measure of frames output, or any other metric that may be measured with respect to the execution of a video game under test and/or a command provided to the user computing system 110 hosting the video game 112 under test.

In some embodiments, the timer system 120 may modify or adjust the measured time to account for measured delays within the video game test system 102. For example, in some cases, there is a non-infinitesimal amount of time that occurs between the decoded pixels being provide to the controller 118 and the processed or filtered subset of pixels being communicated to the timer system 120. For instance, in one prototype the communication time between the controller 118 and the timer system 120 was consistently determined to be 3.8 milliseconds. Thus, the timer system 120 can be configured to adjust the measured time by 3.8 milliseconds to account for delays introduced by the video game test system 102. In certain embodiments, additional delays may occur due to limitations of the user computing system 110 or the particular game engine being used to create the video game 112. In some cases, the timer system 120 can modify the measured elapsed time by the additional delays.

The user interface circuit 108 may be implemented as an application specific integrated circuit (ASIC), a field programmable gate array (FPGA), a microcontroller (for example, a Cortex® M4 from ARM® as used in a prototype of the front-end test system 104), or any other type of special purpose computing system or integrated circuit. Further, the user interface circuit 108 may interface with a port of the user computing system 110. This port may be a proprietary port or a standardized port, such as a Universal Serial Bus (USB) port. The use of a special purpose circuit enables the front-end test system 104 to be miniaturized. For example, the front-end test system may be as small as or smaller than a user interface device being simulated by the front-end test system 104. Alternatively, in certain embodiments, the user interface circuit 108 may be a general purpose computer. Further, the command sequence repository 114 may be implemented in any type of a volatile or non-volatile memory, such as a ROM, RAM, SRAM, flash memory, or a magnetic hard disk drive. In certain embodiments, the command sequence repository may be implemented in memory of the user interface circuit 108. Thus, in certain embodiments, the user interface circuit 108 and the command sequence repository 114 may be combined.

The decoder 116 may be implemented using an ASIC, FPGA, microcontroller, or any other type of special purpose computing system or integrated circuit. For example, the decoder 116 may be a digital signal processor specifically designed to convert HDMI signals to pixels. In a prototype implementation of the back-end test system 106, a custom built HDMI decoder board that includes an ADV 7611 ASIC from Analog Devices® was used to implemented the decoder 116. However, the decoder 116 is not limited as such, and any special purpose system or integrated circuit may be used to decode the output of the user computing system 110 into pixels.

The controller 118 may be implemented using an ASIC, FPGA, microcontroller, or any other type of special purpose computing system or integrated circuit. Further, the controller 118 may receive pixels from the decoder 116 as the output signals of the user computing system 110 are converted or decoded. In other words, in certain embodiments, the pixels may be streamed in a particular order (for example, top left to bottom right for an image) to the controller 118. By streaming the pixels to the controller 118 as they are generated, the controller 118 can more easily identify a subset of pixels to provide to the timer system 120.

The timer system 120 may be implemented using an ASIC, FPGA, microcontroller, or any other type of special purpose computing system or integrated circuit. Further, the timer system 120 may receive a subset of pixels from the controller 118. The timer system 120 may extract data from the subset of pixels to determine whether a stop condition or other data has been embedded into the subset of pixels. In some cases, extracting the data from the subset of pixels may include comparing pixel values to a library of pixel values stored at the timer system 120 that are associated with particular data or conditions. For example, the timer system 120 may compare the pixels values of the subset of pixels to a value or set of values indicating that an event has occurred in the video game 112. This value or set of values may be stored in a memory of the timer system 120.

The front-end test system 104 may interface between, or otherwise communicate with, a user computing system 110, a test server 124, and the back-end test system 106. The front-end test system 104 may communicate with the test server 124 via a direct connection or over a network (not shown). Typically, the front-end test system 104 will communicate via a direct connection, such as a physical wire, with the user computing system 110 and the back-end test system 106. It is desirable to have a direct connection between each of the front-end test system 104, the back-end test system 106, and the user computing system 110 to reduce or eliminate communication latency. This communication latency can add errors in the measurement of latency between interaction with a user input device and an occurrence of a corresponding event in the video game 112. Although it is generally desirable for the connections between each of the front-end test system 104, the back-end test system 106, and the user computing system 110 to be direct or wired connections, it is possible, and sometimes even desirable, for at least one of the connections to be wireless connections. For example, it may be desirable to test the amount of latency introduced by use of a wireless controller to determine whether the video game 112 has a desired responsiveness when using a wireless controller. In some such cases, the front-end test system 104 may be configured to communicate wirelessly with the user computing system 110 to obtain test measurements of latency between interaction with a user input device and the occurrence of a corresponding event in the video game 112.

As previously stated, the user computing system 110 may include or host a video game 112. In some cases, the video game 112 may execute entirely on the user computing system 110. In other cases, the video game 112 may execute at least partially on the user computing system 110 and at least partially on another computing system, such as a server. In some cases, the video game 112 may execute entirely on the server, but a user may interact with the video game 112 via the user computing system 110. For example, the game may be a massively multiplayer online role-playing game (MMORPG) that includes a client portion executed by the user computing system 110 and a server portion executed by one or more application host systems that may be included as part of a network-based interactive computing system. As another example, the video game 112 may be an adventure game played on the user computing system 110 without interacting with another system.

The user computing system 110 may include hardware and software components for establishing communications over a communication network (not shown). For example, the user computing system 110 may be equipped with networking equipment and network software applications (for example, a web browser) that facilitate communications via a network (for example, the Internet) or an intranet. The user computing system 110 may have varied local computing resources, such as central processing units and architectures, memory, mass storage, graphics processing units, communication network availability and bandwidth, and so forth. Further, the user computing system 110 may include any type of computing system. For example, the user computing system 110 may include any type of computing device(s), such as desktops, laptops, video game platforms or consoles (such as a PlayStation®, an Xbox®, or a Nintendo Switch™) television set-top boxes, televisions (for example, Internet TVs), network-enabled kiosks, car-console devices, computerized appliances, wearable devices (for example, smart watches and glasses with computing functionality), and wireless mobile devices (for example, smart phones, PDAs, tablets, or the like), to name a few. In some embodiments, the user computing system 110 may include one or more of the embodiments described below with respect to FIGS. 6 and 7.

The display system 122 can include any system for displaying output of the user computing system 110. In some embodiments, the display system 122 may be part of the user computing system 110. For example, if the user computing system 110 is a portable game system, the display system 122 may be built into the user computing system 110. In other embodiments, the display system 122 may be separate from the user computing system 110. For example, if the user computing system 110 is a game console, the display system 122 may be a television that may be manufactured or sold by a different entity than the user computing system 122.

The test server 124 may include any type of computing system that can interface with the video game test system 102 to provide a series of instructions or commands to the video game test system 102 to perform during a latency testing or determination process, such as the process 200. For example, the test server 124 may be a server computing system, a desktop, a laptop, a network-based or cloud computing system, or any other computing system that a tester may use to facilitate testing a video game 112 or a user computing system 110 hosting the video game 112 using the video game test system 102.

As previously described, to reduce communication latency between the video game test system 102 and the user computing system 110, the video game test system 102 may be in direct communication through a wired connection. Although, in certain embodiments, one or more elements of the video game test system may communicate wirelessly with the user computing system 110 enabling a tester to determine an effect on latency for user's that use wireless user interface devices to interact with the video game 112.

The test server 124 may communicate directly with the video game test system 102, or via a network (not shown). The network can include any type of communication network. For example, the network can include one or more of a wide area network (WAN), a local area network (LAN), a cellular network, an ad hoc network, a satellite network, a wired network, a wireless network, and so forth. Further, in some cases, the network can include the Internet.

Example Command Latency Testing Process

Figure 2:
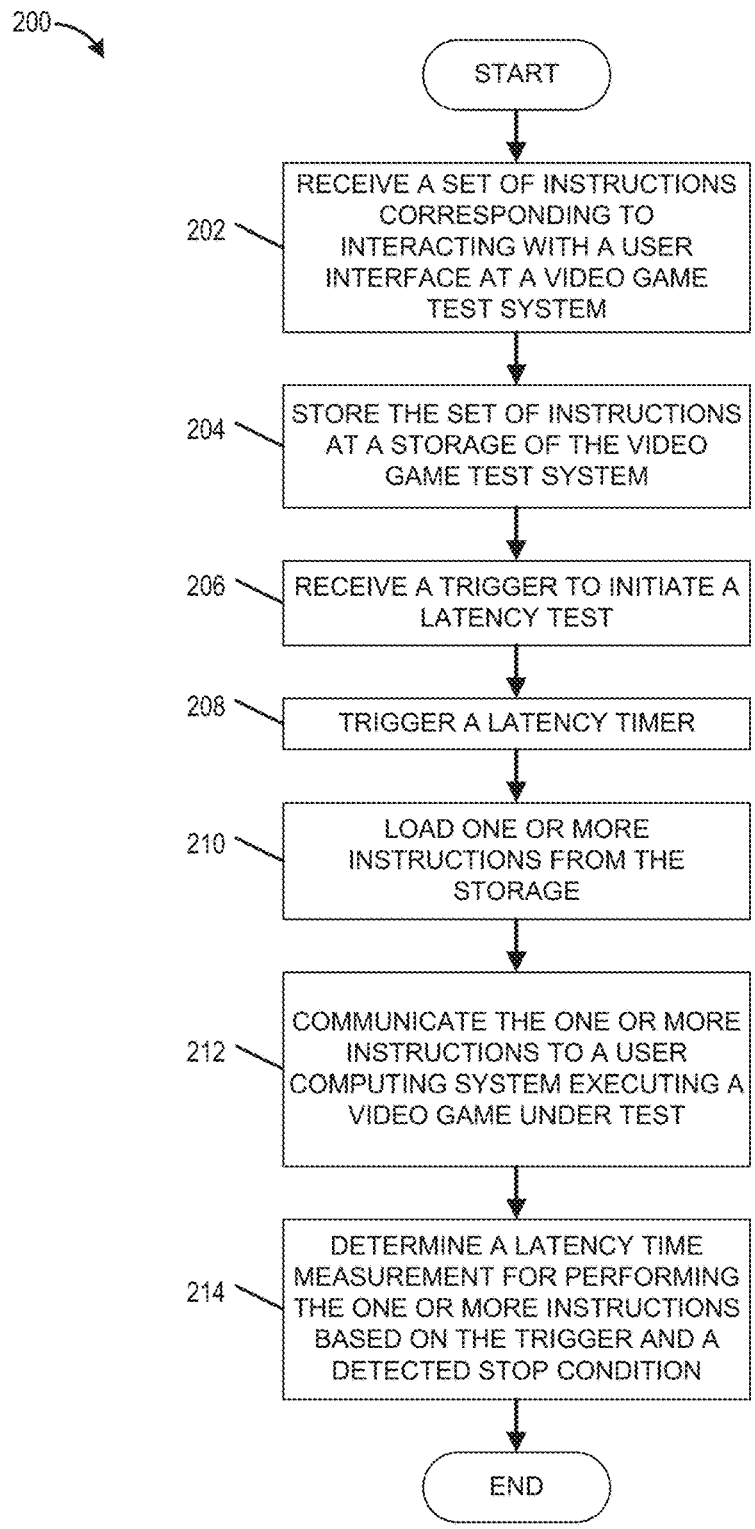
FIG. 2 presents a flowchart of a command execution latency testing process in accordance with certain embodiments.

FIG. 2 presents a flowchart of a command execution latency testing process 200 in accordance with certain embodiments. The process 200 can be implemented by any system that can determine a latency, or measure of time, between an interaction with a video game 112 and the occurrence of an event corresponding to or otherwise triggered by the interaction with the video game 112. The process 200, in whole or in part, can be implemented by, for example, a video game test system 102, a front-end test system 104, a back-end test system 106, a user interface circuit 108, a decoder 116, a controller 118, or a timer system 120, among others. Although any number of systems, in whole or in part, can implement the process 200, to simplify discussion, the process 200 will be described with respect to particular systems.

The process 200 begins at block 202 where the front-end test system 108 receives a set of instructions corresponding to interactions with a user interface. The instructions may include a single instruction, a sequence of instructions, or multiple sequences of instructions. In some cases, each sequence of instructions may be associated with a separate test, a test of a different part of the video game 112, or a test of the video game 112 under different conditions or states. The received instructions may correspond to interactions with a user interface device that a user may perform when playing the video game 112. For example, the instructions may represent the commands provided to a user computing system 110 hosting the video game 112 when a user interacts with the user interface device. For instance, when a user presses the "up" button on a game controller, the game controller may provide a particular command to the user computing system 110 informing the user computing system 110 that the user pressed the "up" button. The instructions received from the front-end test system 108 may include the same particular command. Thus, the received instructions may simulate a user interacting with the game controller.

The user interface device may include any device that a user can use to play or interact with the video game 112. For example, the user interface device may be a gamepad or game controller, a keyboard, a mouse, or a touch sensitive display.

At block 204, the front-end test system 104 stores set of instructions received at the block 202 at a storage of the video game test system 102. For example, the front-end test system 104 may store the set of instructions at the command sequence repository 114 and/or at a memory or storage of the user interface circuit 108. In some embodiments, storing the set of instructions may include storing a label or tag identifying the set of instructions. For example, a tag may indicate or identify the commands included in the set instructions, an action performed at the video game 112 based on a set of instructions, a portion of the video game 112 that may be tested by the set of instructions, or any other information that may distinguish the set of instructions from another set or sequence of instructions stored at the command sequence repository 114.

At block 206, the front-end test system 104 receives a trigger to initiate a latency test. The trigger may be received from a user or may be an automated trigger, such as part of an automated testing process. Further, the trigger may be received in response to a user interacting directly with the video game test system 102 or may be received from the test server 124. In some embodiments, the user computing system 110 may provide the trigger at the block 206. In some cases, the trigger may be or may be received in response to a change in the code of the video game 112. In certain embodiments, the trigger may include an identification of a command or a sequence of commands stored at the command sequence repository 114. For example, the trigger may include a label, tag, or other reference that distinguishes a commander sequence of commands from another commander sequence of commands stored at, for example, the command sequence repository 114.

At block 208, the front-end test system 104 triggers a latency timer at the timer system 120. Triggering the latency timer at the timer system 120 may include starting multiple timers at the timer system 120. For example, in some cases, it may be desirable to measure the amount of time until a plurality of events occur at the video game 112 corresponding one or more commands provided by the user interface circuit 108 to the user computing system 110. Further, in certain embodiments, triggering the latency timer at the timer system 120 may include identifying particular stop conditions for the timer system 120 indicating when the timer system 120 is to stop one or more of the latency timers. Each latency timer may be associated with a different stop condition that is monitored by the timer system 120 as described in more detail below.

In some cases, triggering multiple timers at the timer system 120 may include identifying an order or rank for each timer. The timer system 120 may stop the active timer with the highest rank each time a stop condition detected. Thus, once a first rank timer is stopped, a second rank timer may become the highest ranked timer and may be stopped upon the timer system 120 identifying a second stop condition. Advantageously, in certain embodiments, by triggering a plurality of timers each associated with different stop conditions or configured to be stopped at different times, it is possible for a latency or a measure of time between a command being provided to the user computing system 110 and the occurrence or triggering of a corresponding event to be measured for multiple events that may be triggered by the command.

At block 210, the front-end test system 104 loads one or more instructions from the storage used to store the instructions received at the block 202. For example, the front-end test system 104 may load the one or more instructions from the command sequence repository 114. In some embodiments, the front-end test system 104 may load a single instruction at a time as part of the block 210. In other embodiments, the front end test system 104 may load a sequence of instructions corresponding to a particular test or a subset of the sequence of instructions at a time. The front end test system 104 may determine instructions or sequence of instructions to load based on the trigger received at the block 206 or on a label included with the trigger.

At block 212, the user interface circuit 108 communicates the one or more instructions to a user computing system 110 that is executing a video game 112 under test. Communicating the one or more instructions to the user computing system 110 may include transmitting corresponding data or instructions that a user interface device would communicate to the user computing system 110 when providing the instruction to the user computing system 110. For example, if the user interface circuit 108 is to communicate an instruction associated with pressing and holding a particular button on a game controller, the user interface circuit 108 may communicate the same data or instructions that the game controller would communicate to the user computing system 110. Accordingly, in certain embodiments, the user interface circuit 108 may simulate the game controller or other user interface device of the user computing system 110.

In certain embodiments, operations associated with the block 212 and/or the block 208 may include triggering a different latency timer for each instruction communicated to the user computing system. In other embodiments, the operations associated with the block 212 and/or the block 208 may include triggering a latency timer for the first instruction, the last instruction, or a particular subset of instructions communicated to the user computing system 110.

At block 214, the timer system 120 determines a latency time measurement for performing the one or more instructions based at least in part on the trigger occurring at the block 208 and a detected stop condition. This detected stop condition may be detected based on an output of the user computing system 110. This output may be an output provided to or intended to be provided to the display system 122, but which is captured by the backend test system 106. As previously described, the latency time measurement may be associated with an amount of time that elapses between a command being provided by the user interface circuit 108 to the user computing system 110 and an event occurring at the video game 112. In certain embodiments, the latency time measurement is measured by a number of events within the video game 112 that have occurred and/or a number of frames that have been output since the command was provided by the user interface 108 to the user computing system 110 and the event occurring at the video game 112. Additional details relating to detecting the stop condition in determining the latency time measurement are described below with respect to FIG. 3.

Although described as a single process, it should be understood that the process 200 may be divided into multiple processes and/or operations associated with the process 200 may be performed at different times. For example, operations associated with the blocks 202 and 204 may occur at some time prior to the remaining operations of the process 200. For instance, during a first period of time, one or more sequences of instructions may be received for storage at the command sequence repository 114. During a second period of time occurring sometime after the first period of time one or more tests may be performed on one or more iterations of the video game 112. The one or more tests may include performing operations associated with the blocks 206 through 214 of the process 200.

Further, it should be understood that operations associated with the process 200 may be performed in a different order, serially, or at least partially in parallel. For example, operations associated with the block 208 may be performed subsequent to operations associated with the block 210. As another example, operations associated with the block 208 may be performed at least partially in parallel with operations associated with the block 212. For instance, the user interface circuit 108 may trigger a timer at the timer system 120 as part of the block 208 at the same time, or at substantially the same time, that the user interface circuit 108 communicates at least one instruction to the user computing system 110 as part of the block 212.

Example Latency Determination Process

Figure 3:
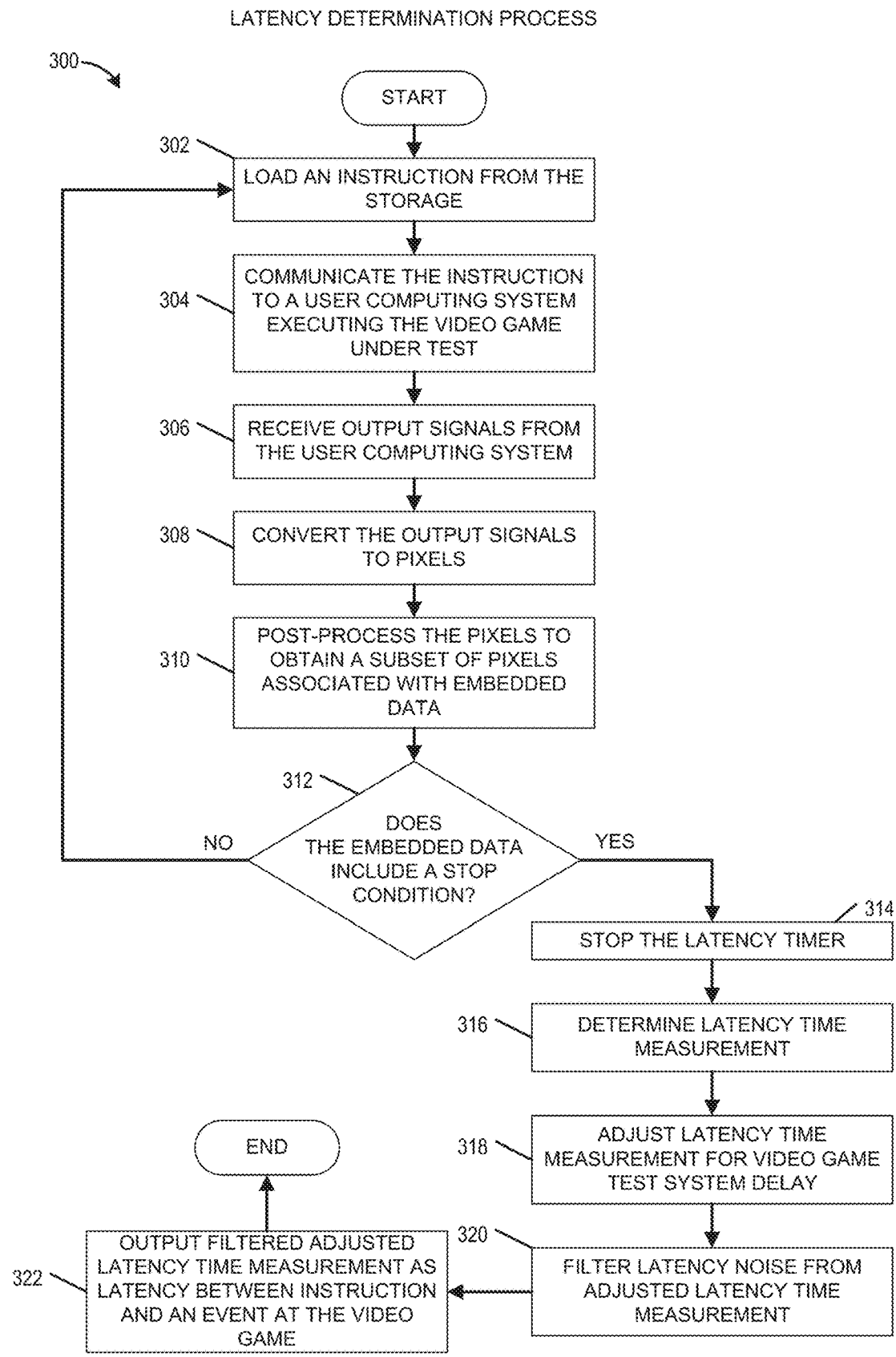
FIG. 3 presents a flowchart of a latency determination process in accordance with certain embodiments.

FIG. 3 presents a flowchart of a latency determination process 300 in accordance with certain embodiments. The process 300 can be implemented by any system that can determine a latency, or measure of time, between an interaction with a video game 112 and the occurrence of an event corresponding to or otherwise triggered by the interaction with the video game 112 by, at least in part, detecting an embedded stop condition in an output. The process 300, in whole or in part, can be implemented by, for example, a video game test system 102, a front-end test system 104, a back-end test system 106, a user interface circuit 108, a decoder 116, a controller 118, or a timer system 120, among others. Although any number of systems, in whole or in part, can implement the process 300, to simplify discussion, the process 300 will be described with respect to particular systems.

In certain embodiments, the process 300 can be combined with, or executed as part of, the process 200. For example, the operations associated with the blocks 306-322 may be performed as, or as part of, the operations associated with the block 214 of process 200. Further, the blocks 302 and 304 may correspond to the blocks 210 and 212, respectively.

The process 300 begins at block 302 where the front end test system 104 loads an instruction from storage, such as the command sequence repository 114. In certain embodiments, the block 302 may include one or more of the embodiments described with respect to the block 210.

At block 304, the user interface circuit 108 communicates the instruction to a user computing system 110 that hosts or executes at least part of the video game 112 under test. In certain embodiments, the block 304 may include one or more of the embodiments described with respect to the block 212.

At block 306, the backend test system 106 receives output signals from the user computing system 110. The output signals may be received from an output port of the user computing system 110 that is configured to provide output to a display system 122. For example, the output port may be an HDMI port, a DisplayPort, or any other video output port. In certain embodiments, the backend test system 106 is connected to the user computing system 110 in place of the display system 122. In other embodiments, a signal capture device or splitter may be used to obtain a copy of the signals output to the display system 122 without preventing the signals from being provided to the display system 122. Thus, in certain embodiments, backend test system 106 may be used to measure latency while a user observes content output to the display system 122. By enabling a user to view the display system 122 as the backend test system measures latency, a user can determine whether to modify a test being performed based at least in part on the view displayed on the display system 122. The output signals received from the user computing system 110 may correspond to an image or frame of an animation is output by the video game 112 for display.

At block 308, the decoder 116 converts the output signals to pixels. Inverting the output signals to pixels may include generating an image or a frame of an animation based on the output signals.

At block 310, the controller 118 post-processes the pixels to obtain a subset of pixels associated with embedded data. Post-processing the pixels may include filtering the pixels that form the image or the frame of the animation generated at the block 308 to obtain the subset of pixels associated with the embedded data. Alternatively, or in addition, post-processing the pixels may include selecting or otherwise obtaining the subset of pixels that are designated to include the embedded data. In certain embodiments, the post-processing involves cropping the image or the frame to isolate the subset of pixels that are designated to include the embedded data. The subset of pixels may include a particular number of pixels from the image such as the first 1024 or 2048 pixels. Alternatively, the subset of pixels may be the pixels associated with the particular amount of data, such as 2048 bits or 2048 bytes of data included in the image or frame.

The subset of pixels for the image or the frame of the animation includes the pixels that are designated to include the embedded data, but may or may not include embedded data for the particular image. In other words, in certain embodiments, certain images or frames may include embedded data while other images are frames may not include embedded data.

At decision block 312, the timer system 120 determines whether embedded data includes a stop condition. In certain embodiments, determining whether the embedded data includes a stop condition may include determining whether the subset of pixels includes embedded data. If it is determined that the subset of pixels does not include embedded data, the decision block 312 determines that a stop condition has not occurred.

The stop condition may include any data that may be inserted into an image or frame of an animation by an API or SDK when code associated with the video game 112 is executed. For example, when a particular event occurs during execution of the video game 112, a function included in the API may be called to insert particular data into an image or frame of an animation to be output to alert a user or the backend test system 106 of the occurrence of the event. This particular data may be a particular color or opaqueness for a set of pixels within the image or frame. In some cases, the stop condition may be a particular label or other value stored in the bytes of memory configured to store pixel data.

The API or SDK may be part of or may provide test code or test tools for testing or facilitating testing code of the video game. For example, for particular code snippets that a developer desires to test, the developer may insert a call to a function in the API or SDK that facilitates testing of the code snippet at the end of the code snippet. In a case where the developer wants to test the latency of a particular event, the developer may insert a call to a function at the end (or other desired location) of the code to be tested that inserts or embeds data into a frame that is to be output. This embedded data may substitute some of the pixels in the frame with information (for example a stop condition, a label, or other marker) that enables the video game test system 102 to detect that the particular event has occurred. Thus, once the information indicating that the event has occurred has been decoded from the frame, the video game test system 102 can use the timer to determine an amount of elapsed time since the timer was initiated or the simulated user interaction was received that caused the particular event to occur.

In some embodiments, the stop condition may be inserted when a particular event, which may be referred to as a "target event" occurs. This target event may correspond to or triggered by the instruction provided to the user computing system 110 at the block 304. In some embodiments, the event is triggered when the video game 112 is in a particular state when the instruction is received by the user computing system 110.

In some embodiments, a programmer may insert a library call to a function included in an API associated with testing of the video game 112. This function may be a function made available by the API to programmers or coders enabling the programmers to extract data from an application being executed to facilitate a testing process. If there is a particular portion of the code that the programmer desires to test, the programmer may insert the function call into the particular portion of the code. Alternatively, the test function may be built-in to or included with some or all of the functions available from the API. In some such cases, a flag or other trigger may be used to activate or deactivate the test functions during execution of the video game 112.

If it is determined at the decision block 312 that the embedded data does not include a stop condition, the process 300 may proceed to the block 302. At the block 302 another instruction may be loaded from the storage to be provided to the user computing system 110. Alternatively, the process 300 may proceed to the block 304. For example, if a series of instructions or commands are loaded at the block 302 initially, process 300 may return to the block 304 to communicate one of the previously loaded instructions to the user computing system 110. As yet another alternative, the process 300 may proceed to the block 306. For example, in some cases, additional instructions may not be provided to the user computing system 110 is part of the test, but the event corresponding to or otherwise triggered by the previously provided instruction may not yet have occurred at the video game 112. Accordingly, the process 300 may return to the block 306 after the decision block 312 to continue to process output until embedded data with the stop condition is identified.

If it is determined at the decision block 312 that the embedded data does include a stop condition, the timer system 120 stops a latency timer at the block 314. Stopping the latency timer may include stopping one of a plurality of ongoing timers. The latency timer stopped may be associated with the stop condition identified at the decision block 312. Other timers managed by the timer system 120 may continue to run. In some embodiments, the timer system 120 does not stop the latency timer at the block 314, but instead records the time elapsed since the latency timer was initiated. Advantageously, in certain embodiments, by recording the time value of the latency timer while permitting the latency timer to continue to run, it is possible for the timer system 120 to monitor the occurrence of multiple events triggered by a single instruction or corresponding to a single instruction communicated to the user computing system using a single timer.

At block 316, the timer system 120 determines a latency time measurement. Determining the latency time measurement may include determining a difference between a point in time when the instruction is communicated to the user computing system or when the instruction is executed by the video game 112, and a point in time when an event occurs at the video game 112 that is triggered by her correspondence to the instruction. As previously described, the event may be a particular animation being played, particular frame within the animation being displayed, a sound being played, a change in state of a particular state variable within the video game 112, a change in state of the video game 112, or any other aspect of the video game 112 that may be modified based at least in part on the instruction provided at the block 304. In certain embodiments, the block 316 may include one or more of the embodiments described with respect to the block 214.

At block 318, the timer system 120 adjusts the latency time measurement for delay introduced by the video game test system 102. Adjusting the latency time measurement for delay introduced by the video game test system 102 may include reducing the latency time measurement by an amount of time associated with elements of the video game test system 102. For example, it was determined during evaluation of a prototype of the video game test system 102 that communication between the controller 118 and the timer system 120 required 3.8 ms. The value of 3.8 ms was a deterministic measurement of the communication between the controller 118 and the timer system 120. Thus, in this particular example, the latency time measurement may be reduced by 3.8 ms. The communication time between the decoder 116 and the controller 118 in the prototype was negligible. However, in embodiments where the communication time between the decoder 116 and the controller 118 is determined to be non-negligible, the latency time measurement may be adjusted by the determined communication time.

Because, in certain embodiments, the video game test system 102 is implemented using one or more application specific hardware devices that are directly connected via pins and or short wires, the amount of latency between the hardware elements of the video game test system 102 may be both deterministic and substantially invariable compared to the use of generic computing hardware. Accordingly, the measurement of latency for a particular instruction in a particular implementation of the video game 112 may be repeatable may provide substantially identical results among multiple test iterations. In certain embodiments, operations associated with the block 318 may be optional or omitted.

At block 320, the timer system 120 filters latency noise from the adjusted latency time measurement. Latency noise may include latency or delays that are unrelated to or not specific to the particular code, resources or assets of the video game 112. In other words, latency noise may be noise that is unrelated to the code created by the programmer or the various animations that may be generated by the graphic artists in developing video game 112. For example, latency noise may include latency introduced by the configuration of the user computing system 110 itself or by a coding engine used to develop the video game 112. For instance, some user computing systems may be configured designed to only display a new frame every $60^{th}$ of a second. However, in some cases, the video game 112 may be able to generate a new frame at a faster rate than once every $60^{th}$ of a second. In such cases, although a frame may be ready for output, the output may be stalled until the user computing system 110 is ready to output another frame. This delay between when a frame is ready for output and when the user computing system 110 can output the frame may be measured and subtracted at the block 320 from the latency time measurement determined at the block 316 or from the adjusted latency time measurement of block 318. In certain embodiments, the delay between when the frame is ready for output and when the user computing system 110 is ready to output the frame may be intentional to prevent screen tearing and may be referred to as vertical synchronization or Vsync.

In some cases, because different types of user computing systems 110 may introduce different latency noise, a developer of the video game 112 may perform latency testing using embodiments disclosed herein on different types further, in certain embodiments, the developer of the video game 112 may make or program different versions of the video game 112 for execution on different types of user computing systems 110. For example, inherent differences between the PlayStation® game system and the Xbox® game system may result in an identical instruction provided to the video game 112 under an identical state being executed with a different latency. In certain embodiments, operations associated with the block 320 may be optional or omitted.

At block 322, the backend test system 106 outputs the filtered adjusted latency time measurement as a latency or a measure of time between receipt of an instruction at the user computing system 110 and the occurrence of a particular event at the video game 112. This output may be displayed on a screen, such as a display of the test server 124. Alternatively, or in addition, the output may be stored at a repository, which may later be accessed by a user or an automated testing system. In some embodiments, a user, such as a developer, may modify code associated with the video game 112 based on the latency time measurement output at the block 322. In certain embodiments, an automated testing or development system may automatically adjust the code or parameters of the video game 112 based on the latency time measurement to obtain a particular target time measurement. In certain embodiments, such as when testing computing systems used in a video game competition (for example in an esports competition), a user may modify the configuration of the user computing system 110 based at least in part on the output of the latency time measurement at the block 322.

In some embodiments, the front-end test system 104 may determine a subsequent instruction to load and/or communicate to the use computing system executing the video game under test based at least in part on the filtered adjusted latency time measurement determined at the block 320. This subsequent instruction may be a repeat of the same instruction previously communicated at the block 304, or may be a different instruction.

Further, in some embodiments, a determination of the instruction to load, or when to provide the instruction to the user computing system may be made based at least in part on embedded data included in the subset of pixels. Advantageously, in certain embodiments, automated testing can be performed that includes determining particular instructions to provide and a timing of when to provide the instructions based on a detection of a particular state of the video game under test. This particular state of the video game under test may be communicated to the front-end test system 104 be the data embedded in the subset of pixels.

In some embodiments, a measure of efficiency of the code of the video game can be determined based at least in part on the measured latency of one or more instructions provided at the block 304. Further, efficiency at different points within the video game can be compared by measuring the latency of commands performed during different states of the video game. In addition, the latency of commands performed for different versions of the video game can be compared to determine a relative efficiency between different versions of the video game that may operate on different types of computing systems and/or on the same type of computing system, but with changes in the code of the video game 112.

Although this disclosure primarily relates to using visual output to test the video game 112, in certain embodiments audio output may be used. For example, the video game 112 may play particular sound when an event occurs. The sound may be captured by the backend test system 106 indicate that a timer should cease and no latency measures should be determined.

Example Output Frame with Embedded Data

Figure 4:
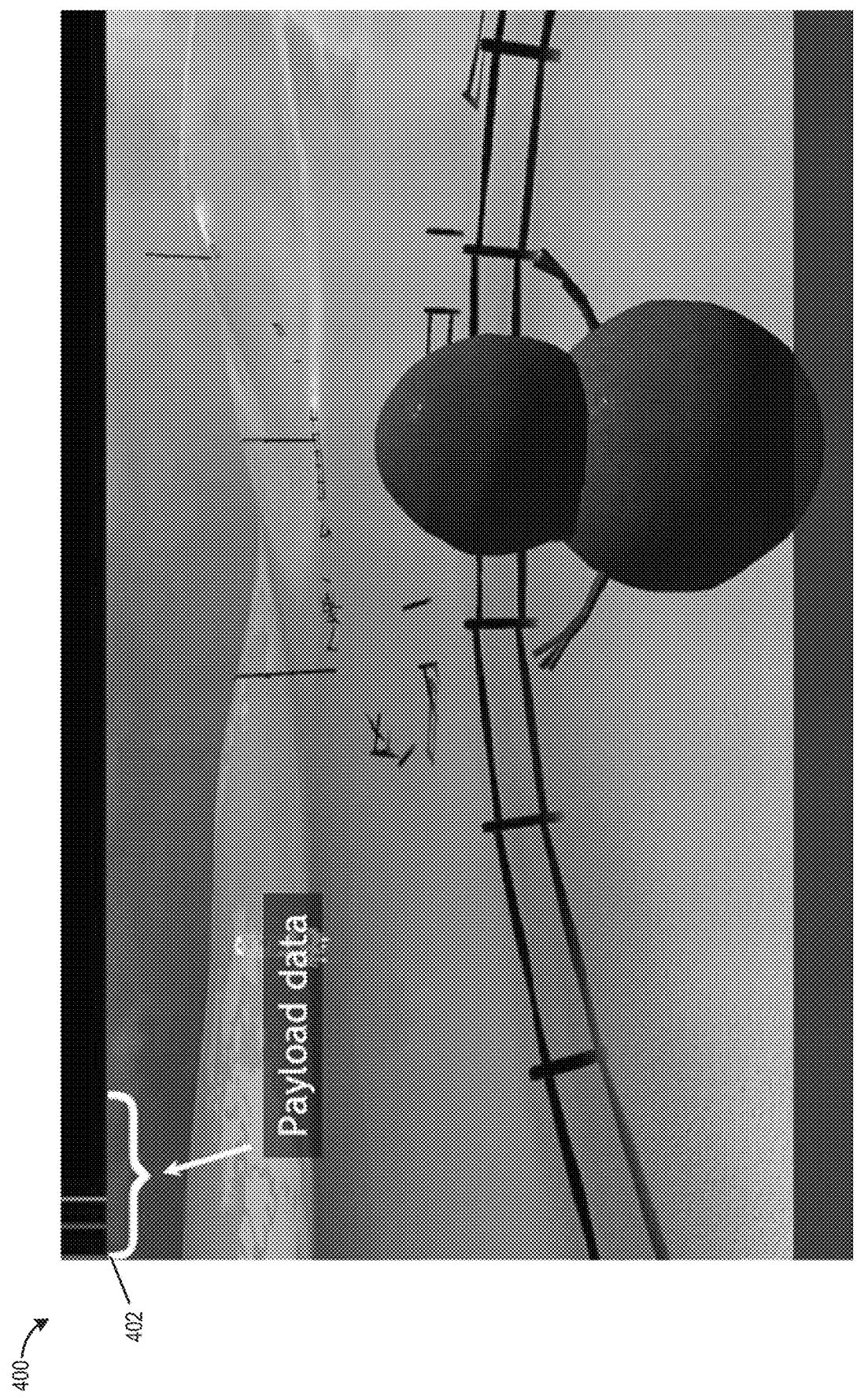
FIG. 4 illustrates an example output frame including embedded data in accordance with certain embodiments.

FIG. 4 illustrates an example output frame 400 including embedded data in accordance with certain embodiments. The output frame 400 may be one frame of an animation that is output by a video game 112. This animation may be part of a video or non-interactive animation being played or may be part of an interactive scene that changes in response to inputs from a user. A portion of the output frame 400 may be configured to include embedded data that has been inserted into the frame 400 by an API, SDK, or library used during the development of the video game 112. This portion of the output frame may be a particular set of pixels designated to have certain colors or opaqueness values that correspond to information that the developer wants to obtain from the video game 112. This information may be the occurrence or triggering of an event within the video game 112. This portion of the frame 400 may be referred to as the payload 402 and the embedded information may be referred to as the payload data.

In certain embodiments, different colors or opaqueness values may indicate different information or the occurrence of different events within the video game 112. Similarly, different pixels within the payload 402 may be associated with different events being monitored. It should be understood that the payload 402 of the frame 400 is the medium of communication that identifies the event that has been triggered by, for example, a received command. However, the event may or may not be the occurrence of the animation or frame of the animation itself. For example, the event may be the setting of a particular state within the video game 112 that may not be visible to a user, such as the adding of an item to a character's inventory. Although a user may access the inventory to see the item, the inventory may not necessarily be displayed at the time that the item is added to the inventory. A tester may want to determine how quickly the item is added to the user's inventory when the user interacts with the item to pick it up. As another example, the event may be the playing of a sound or the shooting of an enemy that is not visible at a particular point in time when the projectile hits the enemy.

Figure 5:
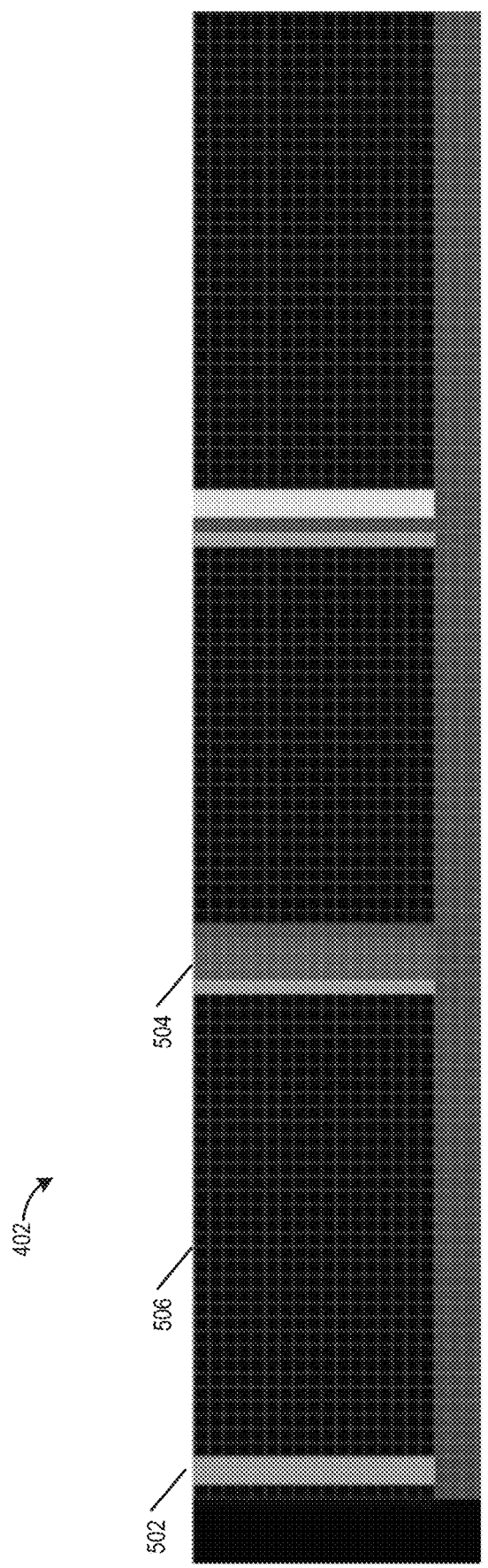
FIG. 5 illustrates an expanded view of a portion of the example output frame of FIG. 4 in accordance with certain embodiments.

FIG. 5 illustrates an expanded view of a portion of the example output frame of FIG. 4 in accordance with certain embodiments. The line 502 may indicate the occurrence of an event in the video game 112. Comparing the line 502 to the line 504, it can be seen that the embedded data may be of different colors and may be spread across a different number of pixels. Each of the line 502 and 504 may be associated with a different event being monitored. In some embodiments, the embedded data is a stop tag or includes data identifying that a stop condition has occurred. The gap 506 between the line 502 and 504 may correspond to events that have not yet occurred or triggered and thus, no embedded data is included in the gap 506.

Although the pixels that include the embedded data are visible in FIGS. 4 and 5, it should be understood that the pixels that include the embedded data may in some cases not be visible. For example, the pixels may be few enough in number to not be visible to an observer. As another example, the pixels with the embedded data may blend into the animation frame being displayed.

Overview of Computing System

Figure 6:
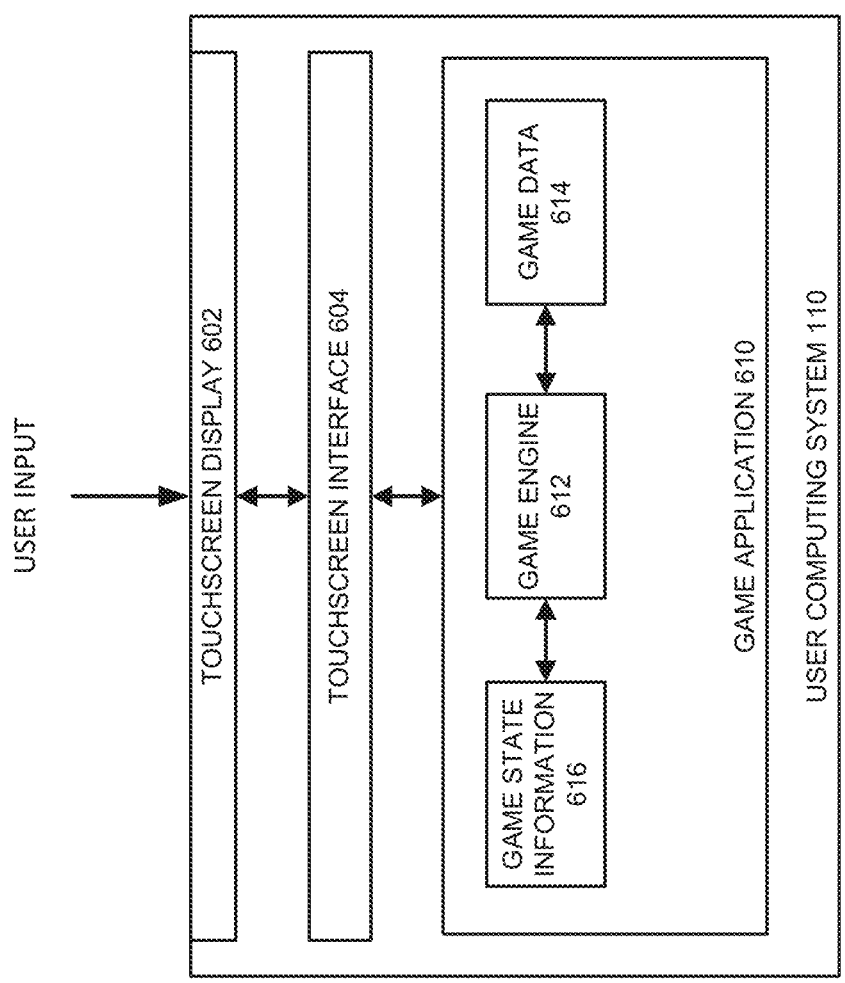
FIG. 6 illustrates an embodiment of a user computing system.

FIG. 6 illustrates an embodiment of a user computing system 110, which may also be referred to as a gaming system. As illustrated, the user computing system 110 may be a single computing device that can include a number of elements. However, in some cases, the user computing system 110 may include multiple devices. For example, the user computing system 110 may include one device that includes that includes a central processing unit and a graphics processing unit, another device that includes a display, and another device that includes an input mechanism, such as a keyboard or mouse.

The user computing system 110 can be an embodiment of a computing system that can execute a game system. In the non-limiting example of FIG. 6, the user computing system 110 is a touch-capable computing device capable of receiving input from a user via a touchscreen display 602. However, the user computing system 110 is not limited as such and may include non-touch capable embodiments, which do not include a touchscreen display 602.

The user computing system 110 includes a touchscreen display 602 and a touchscreen interface 604, and is configured to execute a game application 610. This game application may be the video game 112 or an application that executes in conjunction with or in support of the video game 112, such as a video game execution environment. Although described as a game application 610, in some embodiments the application 610 may be another type of application that may have a variable execution state based at least in part on the preferences or capabilities of a user, such as educational software. While user computing system 110 includes the touchscreen display 602, it is recognized that a variety of input devices may be used in addition to or in place of the touchscreen display 602.

The user computing system 110 can include one or more processors, such as central processing units (CPUs), graphics processing units (GPUs), and accelerated processing units (APUs). Further, the user computing system 110 may include one or more data storage elements. In some embodiments, the user computing system 110 can be a specialized computing device created for the purpose of executing game applications 610. For example, the user computing system 110 may be a video game console. The game applications 610 executed by the user computing system 110 may be created using a particular application programming interface (API) or compiled into a particular instruction set that may be specific to the user computing system 110. In some embodiments, the user computing system 110 may be a general purpose computing device capable of executing game applications 610 and non-game applications. For example, the user computing system 110 may be a laptop with an integrated touchscreen display or desktop computer with an external touchscreen display. Components of an example embodiment of a user computing system 110 are described in more detail with respect to FIG. 7.

The touchscreen display 602 can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 602. The touchscreen interface 604 can be configured to translate the touch input into data and output the data such that it can be interpreted by components of the user computing system 110, such as an operating system and the game application 610. The touchscreen interface 604 can translate characteristics of the tactile touch input touch into touch input data. Some example characteristics of a touch input can include, shape, size, pressure, location, direction, momentum, duration, and/or other characteristics. The touchscreen interface 604 can be configured to determine the type of touch input, such as, for example a tap (for example, touch and release at a single location) or a swipe (for example, movement through a plurality of locations on touchscreen in a single touch input). The touchscreen interface 604 can be configured to detect and output touch input data associated with multiple touch inputs occurring simultaneously or substantially in parallel. In some cases, the simultaneous touch inputs may include instances where a user maintains a first touch on the touchscreen display 602 while subsequently performing a second touch on the touchscreen display 602. The touchscreen interface 604 can be configured to detect movement of the touch inputs. The touch input data can be transmitted to components of the user computing system 110 for processing. For example, the touch input data can be transmitted directly to the game application 610 for processing.

In some embodiments, the touch input data can undergo processing and/or filtering by the touchscreen interface 604, an operating system, or other components prior to being output to the game application 610. As one example, raw touch input data can be captured from a touch input. The raw data can be filtered to remove background noise, pressure values associated with the input can be measured, and location coordinates associated with the touch input can be calculated. The type of touch input data provided to the game application 610 can be dependent upon the specific implementation of the touchscreen interface 604 and the particular API associated with the touchscreen interface 604. In some embodiments, the touch input data can include location coordinates of the touch input. The touch signal data can be output at a defined frequency. Processing the touch inputs can be computed many times per second and the touch input data can be output to the game application for further processing.

A game application 610 can be configured to be executed on the user computing system 110. The game application 610 may also be referred to as a video game, a game, game code and/or a game program. A game application should be understood to include software code that a user computing system 110 can use to provide a game for a user to play. A game application 610 might comprise software code that informs a user computing system 110 of processor instructions to execute, but might also include data used in the playing of the game, such as data relating to constants, images and other data structures. For example, in the illustrated embodiment, the game application includes a game engine 612, game data 614, and game state information 616.

The touchscreen interface 604 or another component of the user computing system 110, such as the operating system, can provide user input, such as touch inputs, to the game application 610. In some embodiments, the user computing system 110 may include alternative or additional user input devices, such as a mouse, a keyboard, a camera, a game controller, and the like. A user can interact with the game application 610 via the touchscreen interface 604 and/or one or more of the alternative or additional user input devices. The game engine 612 can be configured to execute aspects of the operation of the game application 610 within the user computing system 110. Execution of aspects of gameplay within a game application can be based, at least in part, on the user input received, the game data 614, and game state information 616. The game data 614 can include game rules, prerecorded motion capture poses/paths, environmental settings, constraints, animation reference curves, skeleton models, and/or other game application information. Further, the game data 614 may include information that is used to set or adjust the difficulty of the game application 610.

The game engine 612 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 610, the game application 610 can store game state information 616, which can include character states, environment states, scene object storage, and/or other information associated with a state of execution of the game application 610. For example, the game state information 616 can identify the state of the game application at a specific point in time, such as a character position, character action, game level attributes, and other information contributing to a state of the game application.

The game engine 612 can receive the user inputs and determine in-game events, such as actions, collisions, runs, throws, attacks and other events appropriate for the game application 610. During operation, the game engine 612 can read in game data 614 and game state information 616 in order to determine the appropriate in-game events. In one example, after the game engine 612 determines the character events, the character events can be conveyed to a movement engine that can determine the appropriate motions the characters should make in response to the events and passes those motions on to an animation engine. The animation engine can determine new poses for the characters and provide the new poses to a skinning and rendering engine. The skinning and rendering engine, in turn, can provide character images to an object combiner in order to combine animate, inanimate, and background objects into a full scene. The full scene can conveyed to a renderer, which can generate a new frame for display to the user. The process can be repeated for rendering each frame during execution of the game application. Though the process has been described in the context of a character, the process can be applied to any process for processing events and rendering the output for display to a user.

Example Hardware Configuration of Computing System

Figure 7:
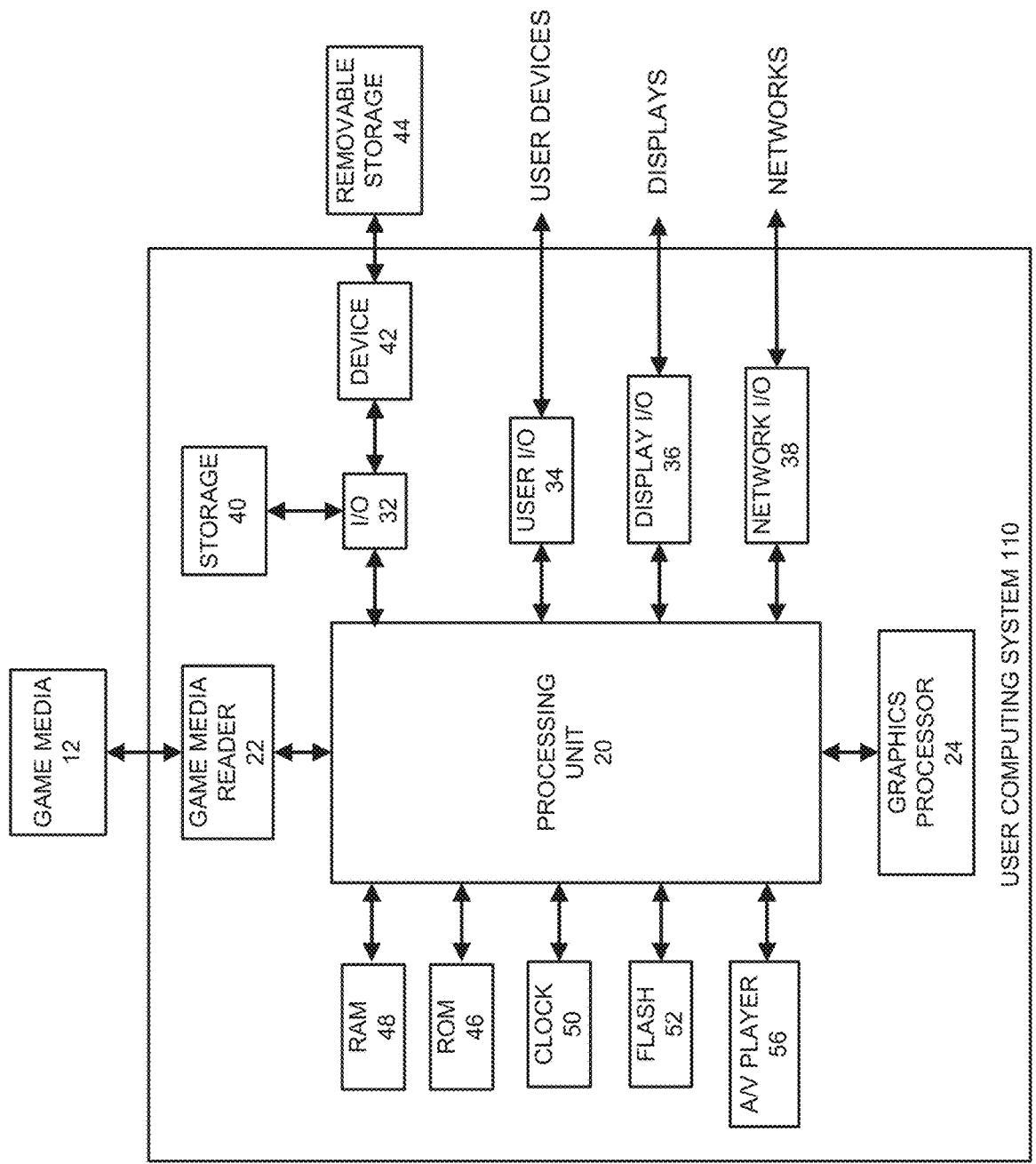
FIG. 7 illustrates an embodiment of a hardware configuration for the user computing system of FIG. 6.

FIG. 7 illustrates an embodiment of a hardware configuration for the user computing system 110 of FIG. 6. Other variations of the user computing system 110 may be substituted for the examples explicitly presented herein, such as removing or adding components to the user computing system 110. The user computing system 110 may include a dedicated game device, a smart phone, a tablet, a personal computer, a desktop, a laptop, a smart television, a car console display, and the like. Further, (although not explicitly illustrated in FIG. 7) as described with respect to FIG. 6, the user computing system 110 may optionally include a touchscreen display 602 and a touchscreen interface 604.

As shown, the user computing system 110 includes a processing unit 20 that interacts with other components of the user computing system 110 and also components external to the user computing system 110. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The user computing system 110 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the user computing system 110 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The user computing system 110 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for computing device 110. Processing unit 20 can communicate through I/O 32 to store data, such as game state data and any shared data files. In addition to storage 40 and removable storage media 44, computing device 110 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played.

Network I/O 38 is used for input/output functions for a network. Network I/O 38 may be used during execution of a game, such as when a game is being played online or being accessed online.

Display output signals may be produced by the display I/O 36 and can include signals for displaying visual content produced by the computing device 110 on a display device, such as graphics, user interfaces, video, and/or other visual content. The user computing system 110 may comprise one or more integrated displays configured to receive display output signals produced by the display I/O 36, which may be output for display to a user. According to some embodiments, display output signals produced by the display I/O 36 may also be output to one or more display devices external to the computing device 110.

The user computing system 110 can also include other features that may be used with a game, such as a clock 50, flash memory 52, and other components. An audio/video player 56 might also be used to play a video sequence, such as a movie. It should be understood that other components may be provided in the user computing system 110 and that a person skilled in the art will appreciate other variations of the user computing system 110.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the user computing system 110 is turned off or loses power.

As user computing system 110 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

Example Embodiments

Embodiments of the present disclosure can be described in view of the following clauses:

Clause 1. A video game test system configured to test an event latency during execution of a video game, the video game test system comprising:
a front-end system configured to:
access a first command that emulates an interaction by a user with a user interface device of a user computing system; and
provide the first command to the user computing system to interact with a video game hosted by the user computing system, wherein providing the first command to the user computing system triggers a timer; and
a back-end system configured to:
receive one or more output signals from the user computing system;
convert the one or more output signals to a set of pixels, the set of pixels corresponding to a frame output for display by the user computing system;
identify a presence of a stop condition embedded in the set of pixels; and
determine an event latency of an event based at least in part on a first time when the timer is triggered and a second time associated with identification of the presence of the stop condition, wherein the event is triggered at least in part by execution of the first command.

Clause 2. The video game test system of clause 1, wherein the front-end system comprises a non-volatile storage configured to store one or more command sequences corresponding to one or more interaction sequences with the user interface device, at least one of the one or more command sequences including the first command.

Clause 3. The video game test system of clause 1, wherein the front-end system comprises a storage configured to store the first command and a user interface circuit configured to provide the first command to the user computing system, and wherein the storage is collocated with the user interface circuit reducing input latency associated with simulating user input to the user computing system.

Clause 4. The video game test system of clause 1, wherein the front-end system is further configured to trigger the timer substantially in parallel with providing the first command to the user computing system.

Clause 5. The video game test system of clause 1, wherein the front-end system is further configured to trigger a second timer when providing a second command to the user computing system.

Clause 6. The video game test system of clause 1, wherein the front-end system comprises a user interface circuit configured to emulate the interaction by the user with the user interface by providing the first command to the user computing system via an interface port of the user computing system.

Clause 7. The video game test system of clause 1, wherein the back-end system comprises the timer.

Clause 8. The video game test system of clause 1, wherein the back-end system is further configured to identify the stop condition by:
filtering a subset of pixels from the set of pixels, the subset of pixels configured to store embedded data;
decoding the subset of pixels to obtain the embedded data; and
determining whether the embedded data includes the stop condition.

Clause 9. The video game test system of clause 1, wherein the back-end system comprises a controller configured to provide a subset of pixels from the set of pixels to the timer.

Clause 10. The video game test system of clause 9, wherein the back-end system is further configured to determine the event latency of the event based at least in part on the first time, the second time, and a communication delay between the controller and the timer.

Clause 11. The video game test system of clause 1, wherein the front-end system comprises one or more integrated circuits and the back-end system comprises one or more integrated circuit that are separate from the front-end system.

Clause 12. The video game test system of clause 1, wherein the event comprises at least one of: output of an animation, output of a frame within the animation, output of a sound, a change in state of the video game, or a change in state of an element of the video game.

Clause 13. The video game test system of clause 1, wherein the front-end system is configured to modify a test of the video game based at least in part on the event latency of the event.

Clause 14. A method of testing an event latency during execution of a video game, the method comprising:
as implemented by a video game test system implemented in hardware,
receiving a trigger to test an event latency of an event within a video game, wherein the event latency comprises an amount of time between interaction with a user interface device of a user computing system hosting the video game and an occurrence of the event;
responsive to receiving the trigger, accessing a first command from a command sequence storage, the first command emulating the interaction by a user with the user interface device;
providing the first command to the user computing system via an interface of the user computing system configured to communicate with the user interface device, wherein the video game test system interfaces with the user computing system as a substitute for the user interface device;
receiving a set of output signals from an output port of the user computing system;
converting the set of output signals to a set of pixels;
identifying a stop flag embedded in the set of pixels; and
responsive to identifying the stop flag, determining the event latency of the event based at least in part on a first time associated with providing the first command and a second time associated with identifying the stop flag.

Clause 15. The method of clause 14, wherein determining the event latency further comprises modifying a determined latency by a communication overhead time associated with communication between elements of the video game test system.

Clause 16. The method of clause 14, wherein determining the event latency further comprises modifying a determined latency by a vertical synchronization latency associated with the user computing system.

Clause 17. The method of clause 14, further comprising filtering the set of pixels to obtain a subset of pixels comprising embedded data, wherein identifying the stop flag embedded in the set of pixels comprises extracting data embedded in the subset of pixels and determining whether the extracted data includes the stop flag.

Clause 18. The method of clause 14, further comprising outputting the event latency for presentation to a user on a user interface.

Clause 19. The method of clause 14, further comprising selecting a second command to provide to the user computing system based at least in part on the event latency.

Clause 20. A video game test system configured to test command execution latency during execution of a video game, the video game test system comprising:

storage configured to store one or more commands that emulate interaction by a user with a user interface device of a user computing system; and
processing circuitry configured to:
access a command from the storage;
provide the command to the user computing system to interact with a video game hosted by the user computing system;
initiate a timer at a first time when providing the command to the user computing system;
obtain a set of output signals from the user computing system, the output signals associated with a frame output for display on a display;
convert the output signals to a set of pixels;
process the set of pixels to obtain embedded data included in a subset of the set of pixels;
stop the timer at a second time when it is determined that the embedded data includes a stop condition; and
determine a command execution latency associated with the command based at least in part on the first time and the second time.

Additional embodiments of the present disclosure can be described in view of the following clauses:

Clause 1. An application test system configured to test code efficiency of an application, the application test system comprising:
a hardware processor configured to:
provide a user command to a computing system hosting an application, the user command simulating user interaction with the application at the computing system;
initiate a timer in parallel with providing the user command to the computing system, wherein there is less than a threshold time difference between when the timer is initiated and the user command is provided to the computing system;
capture output from the computing system that is output via a display port of the computing system;
determine whether the output includes embedded data associated with a stop event; and
upon determining that the output includes the embedded data associated with the stop event, determine a command latency value based on the timer.

Clause 2. The application test system of clause 1, wherein the timer measures a passage of time.

Clause 3. The application test system of clause 1, wherein the timer measures a number of events occurring between initiation of the timer and detection of the stop event.

Clause 4. The application test system of clause 3, wherein the events comprise frames output on a display.

Clause 5. The application test system of clause 1, wherein capturing the output from the computing system does not prevent the output from being provided to a display via the display port.

Clause 6. The application test system of clause 1, wherein the stop event comprises an event performed by the application in response to the user command.

Clause 7. The application test system of clause 1, wherein the application comprises a video game.

Clause 8. The application test system of clause 1, wherein the hardware processor is further configured to determine whether the output includes embedded data associated with the stop event by:
converting the output to a set of pixels of an animation frame;

decoding at least a portion of the set of pixels to obtain a decoded subset of pixels; and determining whether the decoded subset of pixels includes the embedded data associated with the stop event.

Clause 9. The application test system of clause 1, wherein the command latency value comprises a measure of time between an event trigger and an occurrence of a corresponding event, wherein the event trigger comprises providing the user command to the computing system.

Clause 10. The application test system of clause 1, wherein the hardware processor is further configured to select a second user command to provide to the computing system based at least in part on the command latency value.

Clause 11. A method of testing code efficiency of an application, the method comprising:

as implemented by an application test system configured with specific computer-executable instructions, providing a user command to a computing system hosting an application, the user command simulating user interaction with the application at the computing system;

initiating a counter substantially in parallel with providing the user command to the computing system;

capturing output from the computing system that is output via an output port of the computing system;

determining whether the output includes data associated with a target event; and upon determining that the output includes the data associated with the target event, determining a command latency based on a value of the counter.

Clause 12. The method of clause 11, wherein the counter counts an amount of time that has elapsed between initiation of the counter and determination that the output includes the data associated with the target event.

Clause 13. The method of clause 11, wherein the counter counts a number of events that have occurred or frames that have been output between initiation of the counter and determination that the output includes the data associated with the target event.

Clause 14. The method of clause 11, wherein the target event comprises an event performed by the application in response to the user command and a state of the application.

Clause 15. The method of clause 11, wherein determining whether the output includes data associated with a target event comprises:

converting the output to a set of pixels of an image;

decoding at least a portion of the set of pixels to obtain a decoded subset of pixels; and determining whether the decoded subset of pixels includes the data associated with the target event.

Clause 16. The method of clause 15, wherein the data associated with the target event is inserted into the image as a substitute for pixel data of the image by test code inserted into the application.

Clause 17. The method of clause 11, further comprising selecting a second user command to provide to the computing system based at least in part on the command latency.

Clause 18. A non-transitory computer-readable storage medium storing computer executable instructions that, when executed by one or more computing devices, configure the one or more computing devices to perform operations comprising:

providing a user command to a computing system hosting an application, the user command simulating user interaction with the application at the computing system;

initiating a counter substantially in parallel with providing the user command to the computing system;

capturing output from the computing system that is output via an output port of the computing system;

determining that the output includes data associated with a target event; and responsive to determining that the output includes the data associated with the target event, determining a command latency based on a value of the counter.

Clause 19. The computer-readable, non-transitory storage medium of clause 18, wherein determining that the output includes data associated with a target event comprises:

converting the output to a set of pixels of an image;

decoding at least a portion of the set of pixels to obtain a decoded set of pixels; and determining that the decoded set of pixels includes the data associated with the target event.

Clause 20. The computer-readable, non-transitory storage medium of clause 18, wherein the operation further comprise selecting an automated test to perform with respect to the application based at least in part on the command latency.

Additional Embodiments

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A video game test system configured to test an event latency during execution of a video game, the video game test system comprising:
    a front-end system configured to:
        access a first command that emulates an interaction by a user with a user interface device of a user computing system; and
        provide the first command to the user computing system to interact with a video game hosted by the user computing system, wherein providing the first command to the user computing system triggers a timer; and
    a back-end system configured to:
        receive one or more output signals from the user computing system;
        convert the one or more output signals to a set of pixels, the set of pixels corresponding to a frame output for display by the user computing system;
        identify a presence of a stop condition embedded in the set of pixels; and
        determine an event latency of an event based at least in part on a first time when the timer is triggered and a second time associated with identification of the presence of the stop condition, wherein the event is triggered at least in part by execution of the first command, and wherein the back-end system is further configured to identify the stop condition by:
            filtering a subset of pixels from the set of pixels, the subset of pixels configured to store embedded data;
            decoding the subset of pixels to obtain the embedded data; and
            determining whether the embedded data includes the stop condition.

2. The video game test system of claim 1, wherein the front-end system comprises a non-volatile storage configured to store one or more command sequences corresponding to one or more interaction sequences with the user interface device, at least one of the one or more command sequences including the first command.

3. The video game test system of claim 1, wherein the front-end system comprises a storage configured to store the first command and a user interface circuit configured to provide the first command to the user computing system, and wherein the storage is collocated with the user interface circuit reducing input latency associated with simulating user input to the user computing system.

4. The video game test system of claim 1, wherein the front-end system is further configured to trigger the timer in parallel with providing the first command to the user computing system.

5. The video game test system of claim 1, wherein the front-end system is further configured to trigger a second timer when providing a second command to the user computing system.

6. The video game test system of claim 1, wherein the front-end system comprises a user interface circuit configured to emulate the interaction by the user with the user interface by providing the first command to the user computing system via an interface port of the user computing system.

7. The video game test system of claim 1, wherein the back-end system comprises the timer.

8. The video game test system of claim 1, wherein the back-end system comprises a controller configured to provide a subset of pixels from the set of pixels to the timer.

9. The video game test system of claim 8, wherein the back-end system is further configured to determine the event latency of the event based at least in part on the first time, the second time, and a communication delay between the controller and the timer.

10. The video game test system of claim 1, wherein the front-end system comprises one or more integrated circuits and the back-end system comprises one or more integrated circuit that are separate from the front-end system.

11. The video game test system of claim 1, wherein the event comprises at least one of: output of an animation, output of a frame within the animation, output of a sound, a change in state of the video game, or a change in state of an element of the video game.

12. The video game test system of claim 1, wherein the front-end system is configured to modify a test of the video game based at least in part on the event latency of the event.

13. A method of testing an event latency during execution of a video game, the method comprising:
as implemented by a video game test system implemented in hardware,
receiving a trigger to test an event latency of an event within a video game, wherein the event latency comprises an amount of time between interaction with a user interface device of a user computing system hosting the video game and an occurrence of the event;
responsive to receiving the trigger, accessing a first command from a command sequence storage, the first command emulating the interaction by a user with the user interface device;
providing the first command to the user computing system via an interface of the user computing system configured to communicate with the user interface device, wherein the video game test system interfaces with the user computing system as a substitute for the user interface device;
receiving a set of output signals from an output port of the user computing system;
converting the set of output signals to a set of pixels;
identifying a stop flag embedded in the set of pixels; and
responsive to identifying the stop flag, determining the event latency of the event based at least in part on a first time associated with providing the first command and a second time associated with identifying the stop flag, wherein determining the event latency further comprises modifying a determined latency by a communication overhead time associated with communication between elements of the video game test system.

14. The method of claim 13, wherein determining the event latency further comprises modifying a determined latency by a vertical synchronization latency associated with the user computing system.

15. The method of claim 13, further comprising filtering the set of pixels to obtain a subset of pixels comprising embedded data, wherein identifying the stop flag embedded in the set of pixels comprises extracting data embedded in the subset of pixels and determining whether the extracted data includes the stop flag.

16. The method of claim 13, further comprising outputting the event latency for presentation to a user on a user interface.

17. The method of claim 13, further comprising selecting a second command to provide to the user computing system based at least in part on the event latency.

18. A video game test system configured to test command execution latency during execution of a video game, the video game test system comprising:
storage configured to store one or more commands that emulate interaction by a user with a user interface device of a user computing system; and
processing circuitry configured to:
access a command from the storage;
provide the command to the user computing system to interact with a video game hosted by the user computing system;
initiate a timer at a first time when providing the command to the user computing system;
obtain a set of output signals from the user computing system, the output signals associated with a frame output for display on a display;
convert the output signals to a set of pixels;
process the set of pixels to obtain embedded data included in a subset of the set of pixels;
stop the timer at a second time when it is determined that the embedded data includes a stop condition; and
determine a command execution latency associated with the command based at least in part on the first time and the second time wherein the processing circuitry is further configured to determine the command execution latency by modifying a determined latency by a vertical synchronization latency associated with the user computing system.

19. The video game test system of claim 18, wherein the processing circuitry is further configured to determine the command execution latency by modifying the determined latency by a communication overhead time associated with communication between elements of the video game test system.

20. The video game test system of claim 18, wherein the processing circuitry is distributed between a front-end system configured to at least access the command from the storage and a back-end system configured to at least determine the command execution latency associated with the command.

* * * * *